US009195920B2

(12) United States Patent
Johnson et al.

(10) Patent No.: US 9,195,920 B2
(45) Date of Patent: Nov. 24, 2015

(54) SWATHING PARALLEL PIPELINE ARCHITECTURE

(71) Applicant: CANON KABUSHIKI KAISHA, Tokyo (JP)

(72) Inventors: Gregory Joseph Johnson, North Epping (AU); David Ian Johnston, Leichhardt (AU); Zhi-Min Pan, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 13/718,153

(22) Filed: Dec. 18, 2012

(65) Prior Publication Data

US 2013/0169980 A1 Jul. 4, 2013

(30) Foreign Application Priority Data

Dec. 20, 2011 (AU) .............................. 2011265384

(51) Int. Cl.
*G06K 15/02* (2006.01)
*G06F 3/12* (2006.01)

(52) U.S. Cl.
CPC ............ *G06K 15/1836* (2013.01); *G06F 3/124* (2013.01); *G06F 3/1215* (2013.01); *G06K 15/186* (2013.01); *G06K 15/1851* (2013.01); *G06K 15/1857* (2013.01)

(58) Field of Classification Search
CPC ... G06F 3/1215; G06F 3/124; G06K 15/1836; G06K 15/1851; G06K 15/1857; G06K 15/186
USPC .................................................. 358/1.8, 1.15
See application file for complete search history.

(56) References Cited

U.S. PATENT DOCUMENTS

| | | | |
|---|---|---|---|
| 6,825,943 B1 | 11/2004 | Barry et al. | |
| 7,388,686 B2 * | 6/2008 | Saquib et al. | ................. 358/1.8 |
| 7,861,156 B2 | 12/2010 | Wood et al. | |
| 7,911,636 B2 | 3/2011 | Kuhn et al. | |
| 8,570,604 B2 * | 10/2013 | Bane et al. | ................... 358/3.26 |
| 2008/0030760 A1 * | 2/2008 | Tanaka et al. | ................ 358/1.13 |
| 2009/0027716 A1 * | 1/2009 | Kuhn et al. | ................. 358/1.15 |

* cited by examiner

*Primary Examiner* — Iriana Cruz
(74) *Attorney, Agent, or Firm* — Canon U.S.A, Inc. IP Division

(57) ABSTRACT

Disclosed is a method of processing a print job, the print job being received in a page description language format. The method identifies a number of print heads on a printer targeted for printing said print job. The method processes the print job in the page description language format to produce a plurality of intermediate jobs, in which a number of the intermediate jobs is determined by the number of print heads. The intermediate jobs have an intermediate format between the page description language format and a rasterized image format. The method renders each of a plurality of intermediate jobs to a rasterized image in a renderer associated with each of the print heads independently of one another and external input.

23 Claims, 23 Drawing Sheets

SWATHING PARALLEL PIPELINE ARCHITECTURE

REFERENCE TO RELATED APPLICATION

This application claims the benefit under 35 U.S.C. §119 of the filing date of Australian Patent Application No. 2011265384, filed Dec. 20, 2011, hereby incorporated by reference in its entirety as if fully set forth herein.

TECHNICAL FIELD

The current invention relates to the field of raster image processing for high-speed digital presses.

BACKGROUND

Digital press print engines are designed for long runs of printing where stopping and starting are infrequent. As such any page description language (PDL) rendering system must be able to keep pace with the speed of the printer engine. In a worst case situation, if there is a data underflow, paper is wasted while the printer slows down to stop and speeds up again on re-start as well as time lost while the engine is not printing.

Two typical approaches exist which try to address these requirements in PDL rendering for high-speed digital presses. One approach is to pre-raster image process (RIP) all of the PDL data off-line in order to deliver pixels to the printer engine at the target data rate. However this approach requires a lot of bandwidth in the input/output (IO) subsystem and network interconnections. Consider a colour digital press capable of the equivalent of 2000 A4 pages per minute (PPM) at 1200 dots per inch (DPI). If the colour image data is 8-bit per channel and with 4-colour channels, then each rendered A4 page is 533 MB in size. At an engine speed of 2000 pages per minute (PPM), that is 17 GB/s of data.

Moving large amounts of data quickly requires expensive high-speed buses. Another option is to use high-performance parallel rendering hardware and large in-memory frame stores in order to render page data and deliver pixels in real time to the printer engine. This approach is also not without its problems as render times for PDL pages are highly variable depending on the complexity of the PDL page.

Given that the high-speed digital press requires data to be transmitted to multiple data channels in order to drive the parallel print heads, using parallelism in the rendering solution to overcome PDL render time variability is an obvious choice. The difficulty comes with implementing a system that will efficiently handle the data requirements in-parallel without saturating storage, network or memory and maintaining the pixel delivery to the printer engine.

Some newer approaches attempt to segment the PDL data and distribute this among multiple PDL RIPs in order to speed up processing. However these systems still rely on traditional PDL rendering which is highly unpredictable in the time taken to render and also requires additional resources such as fonts.

One approach is to pre-process the PDL data and sanitize the PDL data into something that will likely render in the time required. Alternatively a pre-flight check of the data can be done, whereby an offline RIP of the entire PDL job is run to identify pages in the job that do not meet the required render time. The job is then changed to make sure it renders in the time required. Both of these approaches often involve pre-rendering complex pages to device resolution images.

Another method segments an input print job for parallel rendering. This, however has some drawbacks. The intermediate job format used is essentially another PDL, which requires font resource stored elsewhere on the system. The font resources can be different for every job that needs to be rendered, resulting in multiple accesses to the storage where the resource is stored. In this case, the renderer which implements this method has to stop the rendering process, unload old font resources and load new font resources, then start rendering the new job. This will delay the print engine and result in reduced performance.

Yet another method partitions the print job depending on whether a single or multiple RIP is to be performed. The print job is then replicated and substitute RIP commands are appended that affect the processing of the PDL data. This approach results in a duplication of PDL data which is inefficient.

SUMMARY

Disclosed is a method of processing a print job, the print job being received in a page description language format. The method identifies a number of print heads on a printer targeted for printing said print job. The method processes the print job in the page description language format to produce a plurality of intermediate jobs, in which a number of the intermediate jobs is determined by the number of print heads. The intermediate jobs have an intermediate format between the page description language format and a rasterized image format. The method renders each of a plurality of intermediate jobs to a rasterized image in a renderer associated with each of the print heads independently of one another and external input.

Other aspects are also disclosed.

BRIEF DESCRIPTION OF THE DRAWINGS

At least one embodiment of the present invention will now be described with reference to the following drawings, in which.

DETAILED DESCRIPTION INCLUDING BEST MODE

Overview

Figure 7:
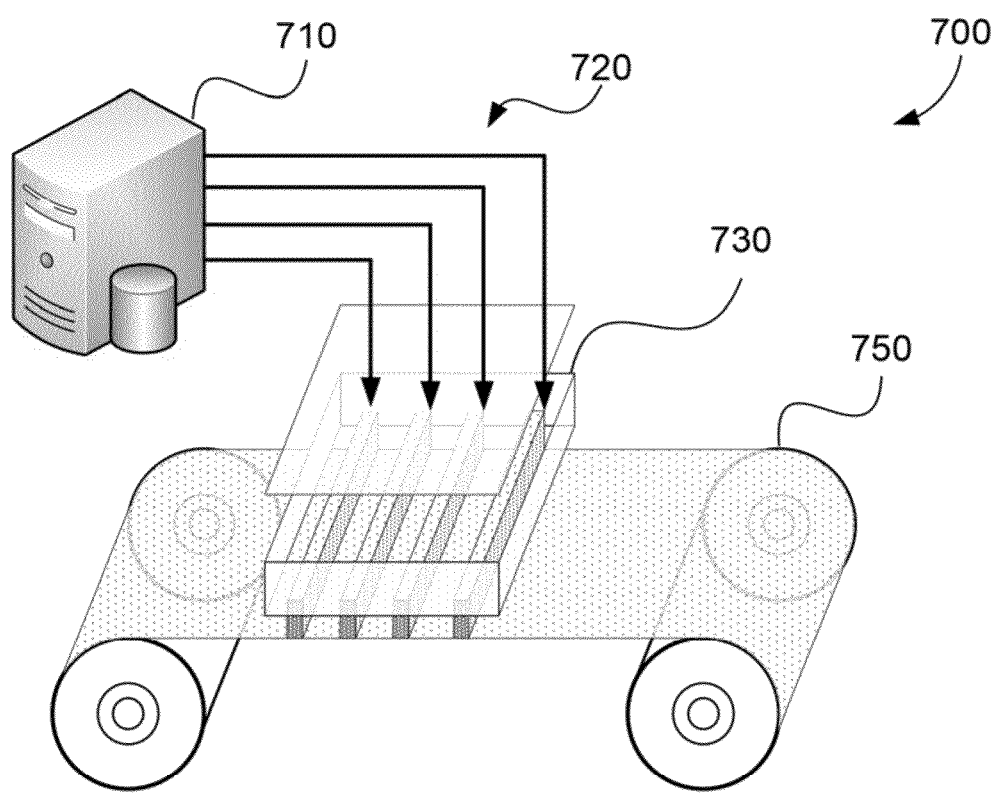
FIG. 7 is a diagram illustrating the relationship between print heads and paper web feed in a digital press.

FIG. 7, schematically illustrates a high-speed digital printing press 700 in which the print media is fed from a large paper roll 750 that is, for example, 1000 mm wide. This continuous roll of paper is usually referred to as a "web", and the printer 700 as being "web-fed". Depending on the size of the document being printed, one or more document pages may be printed across the web, and many document pages along the direction of travel of the web. Once printed, the web of paper is cut and trimmed into individual pages, which may then be bound.

Unlike smaller ink-jet printers, a web-fed digital press moves the paper or media past the print heads 730, rather than moving the heads over the media. As such, the print heads 730 must span the width of the web. Print heads themselves however are not large enough to cover the width of a web. Instead digital presses use multiple heads staggered across the web, as better illustrated in FIGS. 3 and 4. Each physical print head 330,431-434 is monochrome, as such for colour printing multiple rows of these staggered heads are required, as particularly seen in FIG. 4. The print head 330 of FIG. 3 may be Black print heads, but the print heads of FIG. 4 may be Cyan 431, Magenta 432, Yellow 433 and Black 434. The portion of the page printed on by a single print head 330 will henceforth be referred to as a swathe 320 (FIG. 3) and 420 (FIG. 4).

Figure 4:
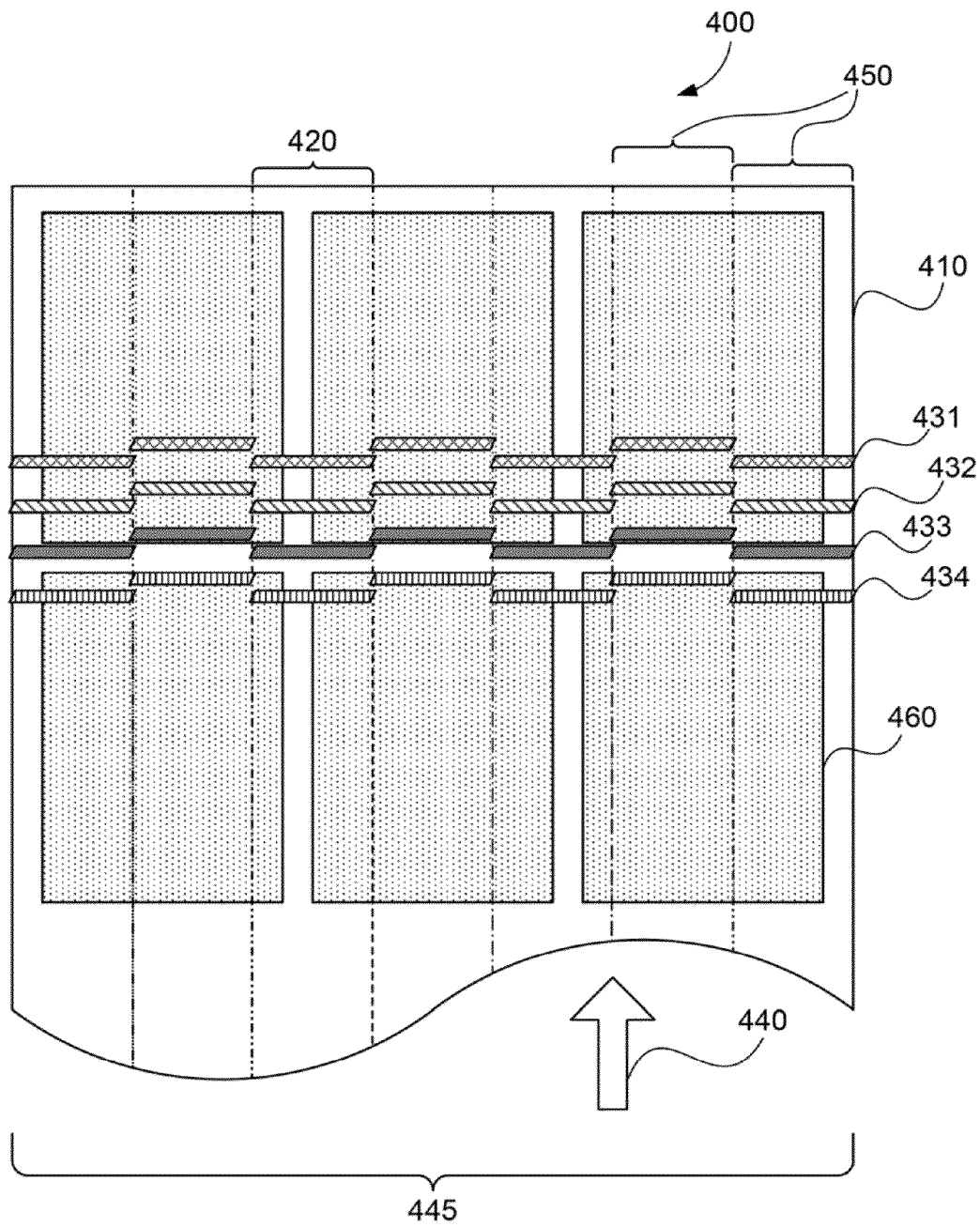
FIG. 4 is a schematic block diagram illustrating the layout of print-heads and pages on a colour digital press web.

With specific reference to FIG. 4, a swathe 420 for the purpose of this document is a section or strip of the printable web 410 that is the width 450 of a print-head 431 and some finite length long. FIG. 4 shows a section of the printable web 410 and the staggered rows of print heads 431-434. A swathe 420 is the strip 420 of the web 410 printed by either a single monochrome print head or set of colour print heads 431-434 such that the set of print heads that define a swathe are aligned in the direction of travel 440 of the web 410.

The present disclosure is concerned with a printer control system that operates from input of print job described in the page description language (PDL) format through to delivery of rendered pixels to multiple print heads.

The arrangements presently described make use of an intermediate page representation called a fillmap. A fillmap is an intermediate format produced after interpretation of the PDL. The fillmap can be serialised and transmitted to a pixel rendering apparatus, where the fillmap is rendered to pixels. The intermediate page representation is less complex than a full PDL, and as such requires fewer rendering resources and can thus be used to render to pixels in a shorter, more predictable time. Other intermediate formats that are less complex than the PDL and thus, allow the renderer to render more quickly may be used in place of the fillmap format described in the exemplary implementations described herein.

A typical target printer for the arrangements presently described is a web-fed, high-speed digital press with characteristics as described above.

Figure 5:
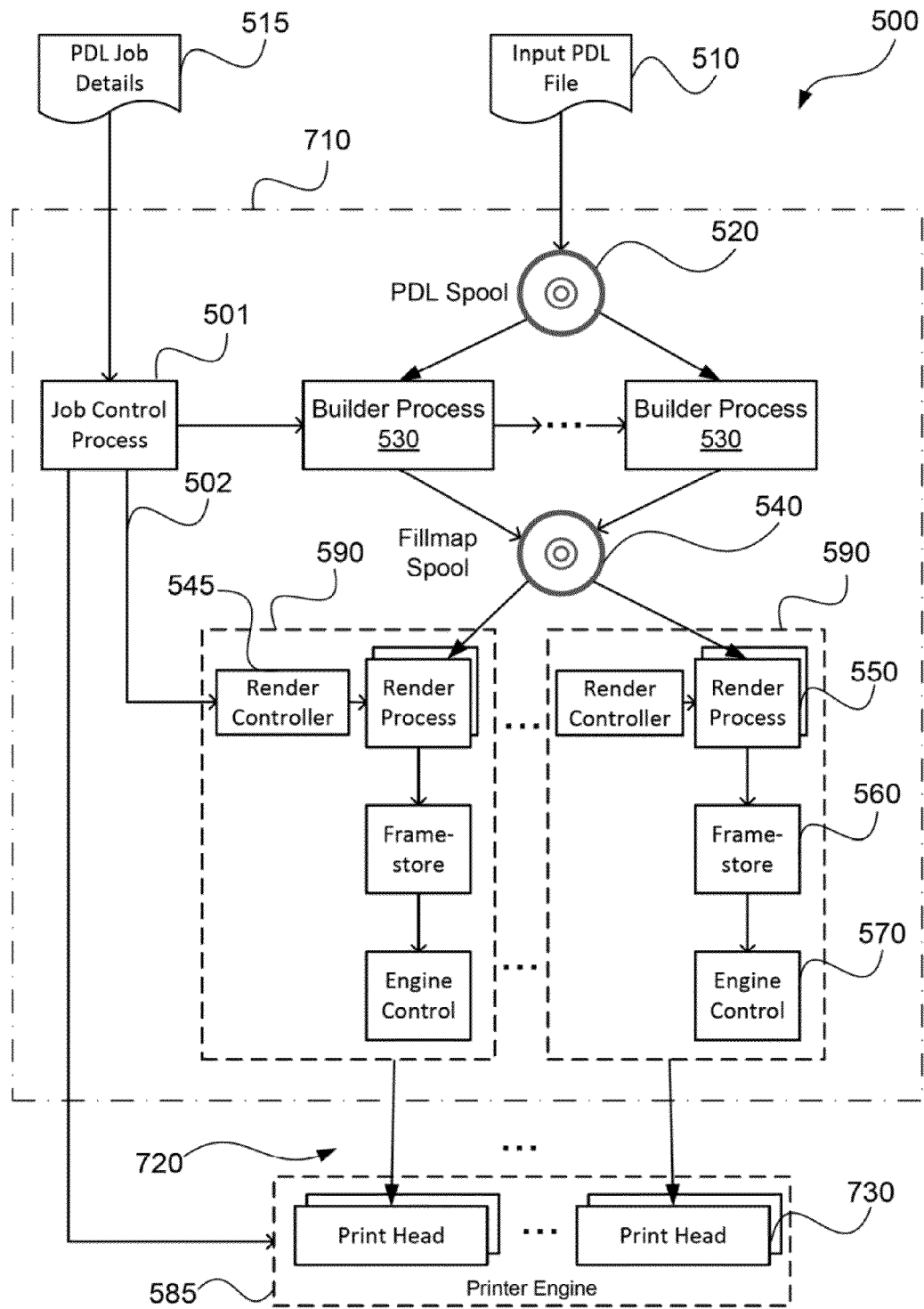
FIG. 5 is a schematic block diagram illustrating the interaction of the major functional components in one implementation of a printing system according to the present disclosure.
Figure 6:
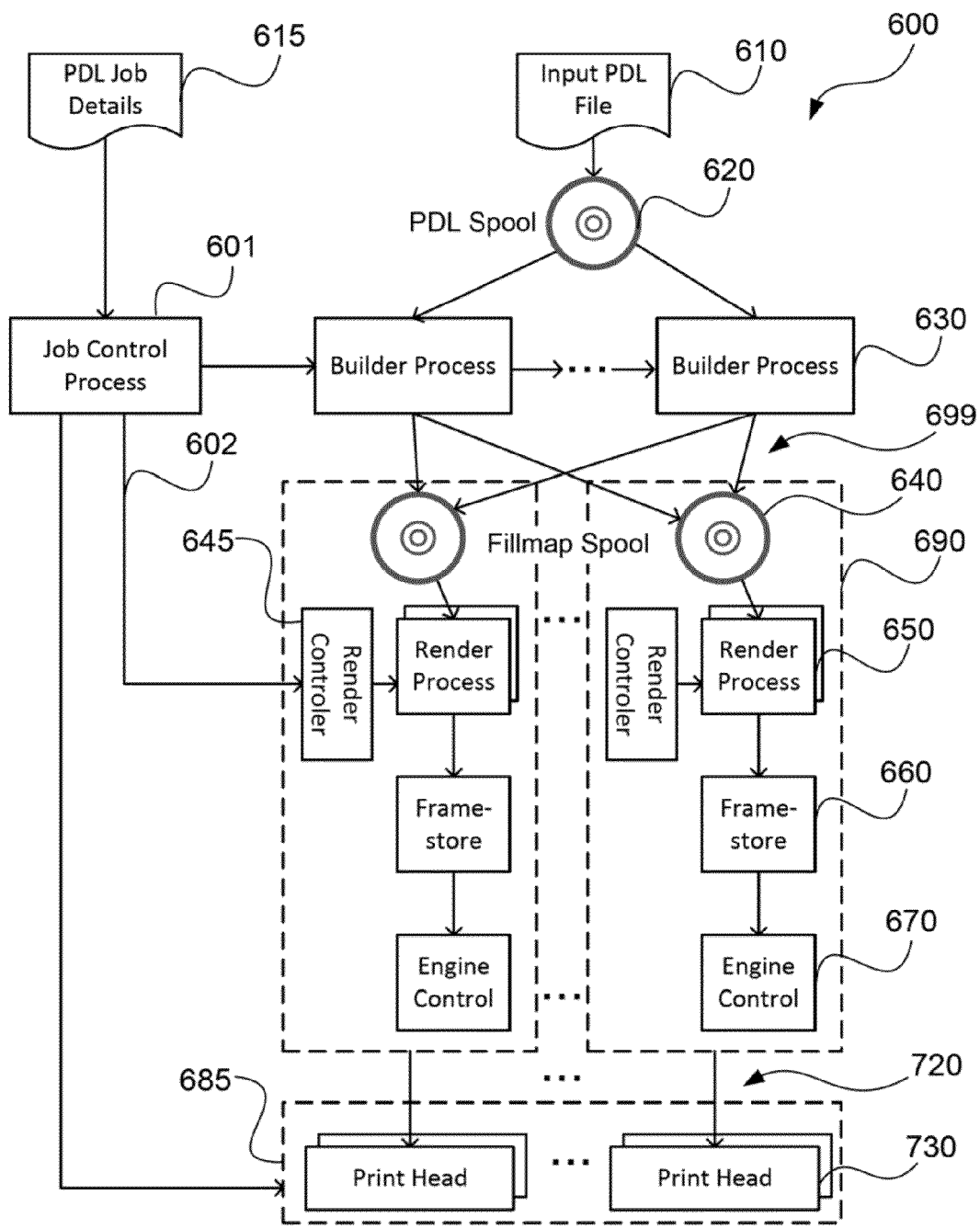
FIG. 6 is a schematic block diagram illustrating an alternate implementation wherein each render server has a local fillmap spool.

The printer control system is a collection of processes running across one or more multi-processor computer devices, for example as depicted by the computer 710 of FIG. 7. The fillmap building and rendering are typically performed on separate multiprocessor computers. Further, to service the entire web, multiple multiprocessor computers will typically be used. FIGS. 5 and 6 illustrate the multiple computer arrangement. However, it may be possible for a particular implementation to work with only a single multiprocessor fillmap builder computer and a single multiprocessor fillmap renderer computer. This would depend on the target printer engine requirements for data.

Figure 1:
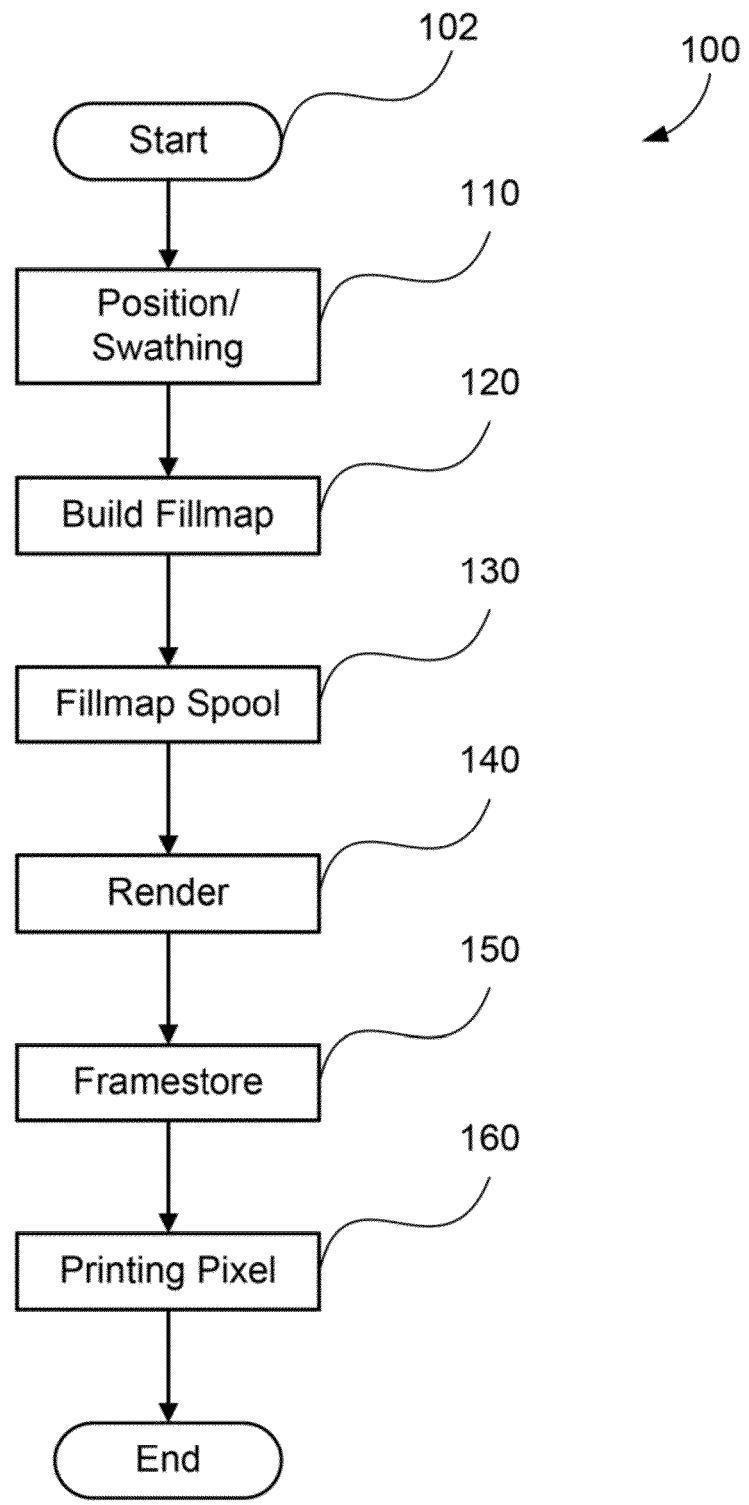
FIG. 1 is a flowchart showing the sequence of events from initial job processing through to pixel delivery to the printer.

FIG. 1 shows a dataflow 100 of a printer control system according to the present disclosure. At a start step 102, input PDL data is submitted into the printer control system. The input data is split into swathe width segment of PDL data in step 110, and the segmented input PDL data is converted to fillmaps in step 120 and stored in a memory structure, called a fillmap spool, in step 130. In step 140, a fillmap renderer reads fillmaps from the fillmap spool and renders the fillmaps to pixels (i.e. pixel data). Pixels output from the renderer are stored in the pixel framestore at step 150, prior to the printer control system outputting the pixels to the print-heads at step 160 for reproduction in the swathes.

Figure 11A:
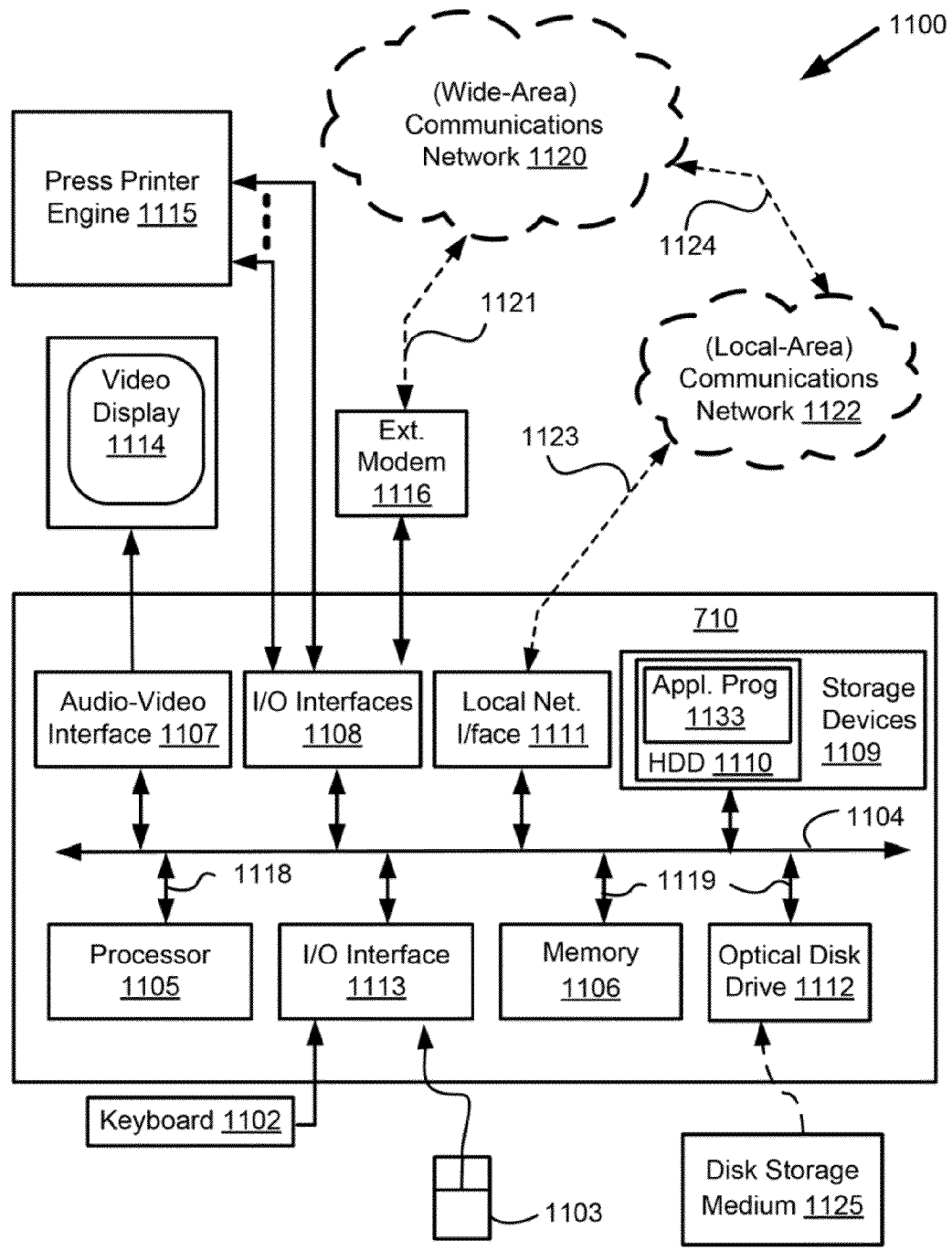
FIGS. 11A and 11B schematically illustrate a computer system that may be used to implement the printing systems of the present disclosure.
Figure 11B:
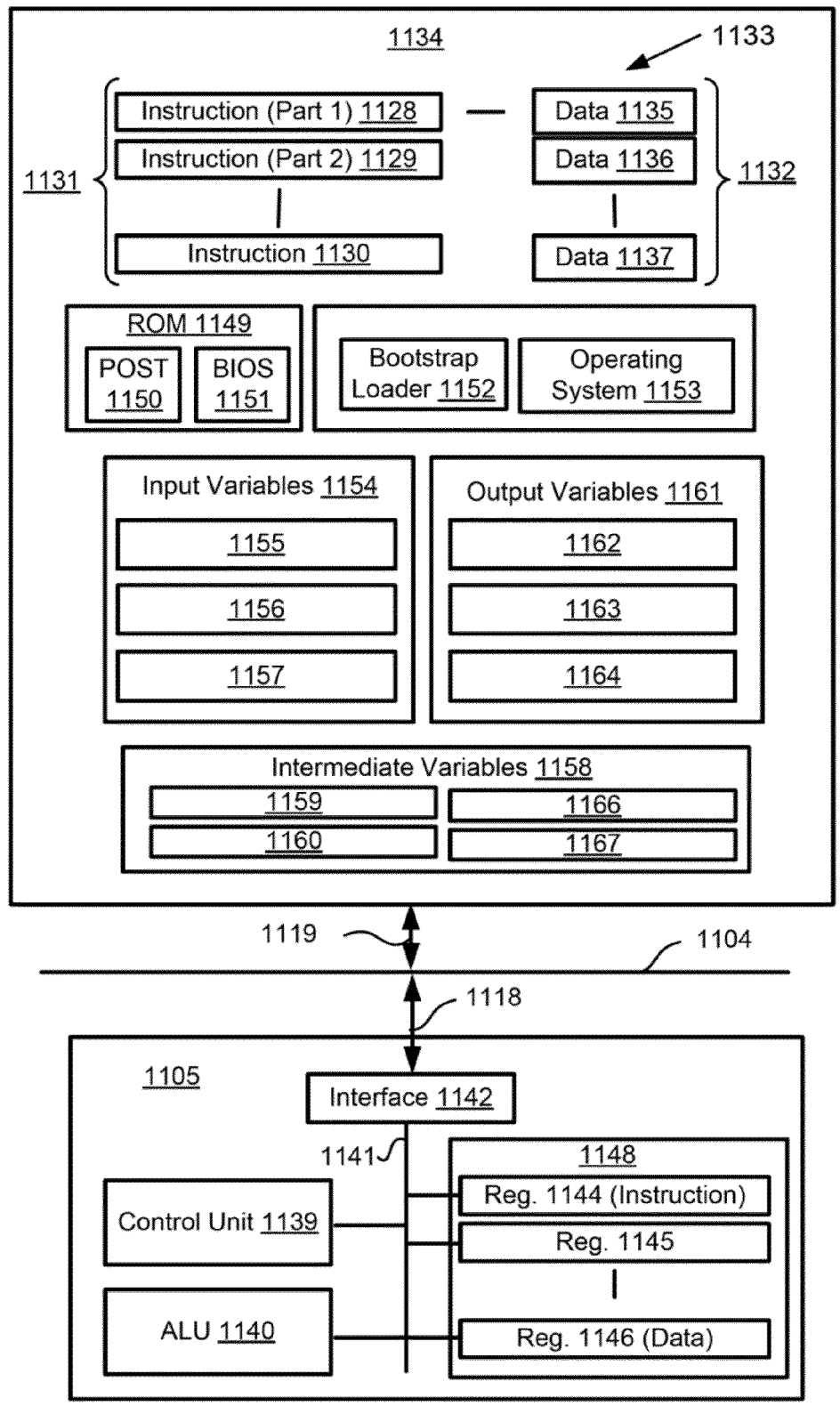

FIGS. 11A and 11B depict the computer system 1100, upon which the various arrangements described can be practiced.

As seen in FIG. 11A, the computer system 1100 as printer control system includes: a multiprocessor computer module 710 such as that seen in FIG. 7, to which may be connected user input devices such as a keyboard 1102 and a mouse pointer device 1103, and output devices including a high-speed high-volume press print engine 1115, and a display device 1114 for local user feedback. An external Modulator-Demodulator (Modem) transceiver device 1116 may be used by the computer module 710 for communicating to and from a communications network 1120 via a connection 1121. The communications network 1120 may be a wide-area network (WAN), such as the Internet, a cellular telecommunications network, or a private WAN. Where the connection 1121 is a telephone line, the modem 1116 may be a traditional "dial-up" modem. Alternatively, where the connection 1121 is a high capacity (e.g., cable) connection, the modem 1116 may be a broadband modem. A wireless modem may also be used for wireless connection to the communications network 1120. The PDL print job is typically delivered to the computer module 710 via the network 1120.

The computer module 710 typically includes at least one processor unit 1105, and a memory unit 1106. The processor unit 1105 is typically a multi-processor device having multiple cores for execution of multiple threads in a distributed manner permitting accelerated processing. The memory unit 1106 typically has semiconductor random access memory (RAM) and semiconductor read only memory (ROM). The computer module 710 also includes an number of input/output (I/O) interfaces including: an audio-video interface 1107 that couples to the video display 1114; an I/O interface 1113 that couples to the keyboard 1102, mouse 1103 or other human interface device (not illustrated); and an interface 1108 for the external modem 1116 and the press print engine 1115. In some implementations, the modem 1116 may be incorporated within the computer module 710, for example within the interface 1108. The computer module 710 also has a local network interface 1111, which permits coupling of the computer system 1100 via a connection 1123 to a local-area communications network 1122, known as a Local Area Network (LAN), which may also be a source of PDL print jobs for the press print engine 1115. As illustrated in FIG. 11A, the local communications network 1122 may also couple to the wide network 1120 via a connection 1124, which would typically include a so-called "firewall" device or device of similar functionality. The local network interface 1111 may comprise an Ethernet™ circuit card, a Bluetooth™ wireless arrangement or an IEEE 802.11 wireless arrangement; however, numerous other types of interfaces may be practiced for the interface 1111.

The I/O interfaces 1108 and 1113 may afford either or both of serial and parallel connectivity, the former typically being implemented according to the Universal Serial Bus (USB) standards and having corresponding USB connectors (not illustrated). Storage devices 1109 are provided and typically include a hard disk drive (HDD) 1110. Other storage devices such as a floppy disk drive and a magnetic tape drive (not illustrated) may also be used. An optical disk drive 1112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1100.

The components 1105 to 1113 of the computer module 710 typically communicate via an interconnected bus 1104 and in a manner that results in a conventional mode of operation of the computer system 1100 known to those in the relevant art. For example, the processor 1105 is coupled to the system bus 1104 using a connection 1118. Likewise, the memory 1106 and optical disk drive 1112 are coupled to the system bus 1104 by connections 1119. Examples of computer platforms on which the described arrangements can be practised include IBM-PC's and compatibles, Sun Sparcstations, Apple Mac™ or a like computer systems.

The printing methods to be described may be implemented using the computer system 1100 wherein the processes of FIGS. 1 to 10, may be implemented as one or more software application programs 1133 executable within the computer system 1100. In particular, the printing methods can be effected by instructions 1131 (see FIG. 11B) in the software 1133 that are carried out within the computer system 1100. The software instructions 1131 may be formed as one or more code modules, each for performing one or more particular tasks. The software may also be divided into two separate parts, in which a first part and the corresponding code modules performs the printing methods and a second part and the corresponding code modules manage a user interface between the first part and the user.

The software may be stored in a computer readable medium, including the storage devices described below, for example. The software is loaded into the computer system 1100 from the computer readable medium, and then executed by the computer system 1100. A computer readable medium having such software or computer program recorded on the computer readable medium is a computer program product. The use of the computer program product in the computer system 1100 preferably effects an advantageous apparatus for high-speed printing.

The software 1133 is typically stored in the HDD 1110 or the memory 1106. The software is loaded into the computer system 1100 from a computer readable medium, and executed by the computer system 1100. Thus, for example, the software 1133 may be stored on an optically readable disk storage medium (e.g., CD-ROM) 1125 that is read by the optical disk drive 1112. A computer readable medium having such software or computer program recorded on it is a computer program product. The use of the computer program product in the computer system 1100 preferably effects an apparatus for high-speed printing.

In some instances, the application programs 1133 may be supplied to the user encoded on one or more CD-ROMs 1125 and read via the corresponding drive 1112, or alternatively may be read by the user from the networks 1120 or 1122. Still further, the software can also be loaded into the computer system 1100 from other computer readable media. Computer readable storage media refers to any non-transitory tangible storage medium that provides recorded instructions and/or data to the computer system 1100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 710. Examples of transitory or non-tangible computer readable transmission media that may also participate in the provision of software, application programs, instructions and/or data to the computer module 710 include radio or infra-red transmission channels as well as a network connection to another computer or networked device, and the Internet or Intranets including e-mail transmissions and information recorded on Websites and the like.

The second part of the application programs 1133 and the corresponding code modules mentioned above may be executed to implement one or more graphical user interfaces (GUIs) to be rendered or otherwise represented upon the display 1114. Through manipulation of typically the keyboard 1102 and the mouse 1103, a user of the computer system 1100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1117 and user voice commands input via the microphone 1180.

FIG. 11B is a detailed schematic block diagram of the processor 1105 and a "memory" 1134. The memory 1134 represents a logical aggregation of all the memory modules (including the HDD 1109 and semiconductor memory 1106) that can be accessed by the computer module 710 in FIG. 11A.

When the computer module 710 is initially powered up, a power-on self-test (POST) program 1150 executes. The POST program 1150 is typically stored in a ROM 1149 of the semiconductor memory 1106 of FIG. 11A. A hardware device such as the ROM 1149 storing software is sometimes referred to as firmware. The POST program 1150 examines hardware within the computer module 710 to ensure proper functioning and typically checks the processor 1105, the memory 1134 (1109, 1106), and a basic input-output systems software (BIOS) module 1151, also typically stored in the ROM 1149, for correct operation. Once the POST program 1150 has run successfully, the BIOS 1151 activates the hard disk drive 1110 of FIG. 11A. Activation of the hard disk drive 1110 causes a bootstrap loader program 1152 that is resident on the hard disk drive 1110 to execute via the processor 1105. This loads an operating system 1153 into the RAM memory 1106, upon which the operating system 1153 commences operation. The operating system 1153 is a system level application, executable by the processor 1105, to fulfil various high level functions, including processor management, memory management, device management, storage management, software application interface, and generic user interface.

The operating system 1153 manages the memory 1134 (1109, 1106) to ensure that each process or application running on the computer module 710 has sufficient memory in which to execute without colliding with memory allocated to another process. Furthermore, the different types of memory available in the system 1100 of FIG. 11A must be used properly so that each process can run effectively. Accordingly, the aggregated memory 1134 is not intended to illustrate how particular segments of memory are allocated (unless otherwise stated), but rather to provide a general view of the memory accessible by the computer system 1100 and how such is used.

As shown in FIG. 11B, the processor 1105 includes a number of functional modules including a control unit 1139, an arithmetic logic unit (ALU) 1140, and a local or internal memory 1148, sometimes called a cache memory. The cache memory 1148 typically includes a number of storage registers 1144-1146 in a register section. One or more internal busses 1141 functionally interconnect these functional modules. The processor 1105 typically also has one or more interfaces 1142 for communicating with external devices via the system bus 1104, using a connection 1118. The memory 1134 is coupled to the bus 1104 using a connection 1119.

The application program 1133 includes a sequence of instructions 1131 that may include conditional branch and loop instructions. The program 1133 may also include data 1132 which is used in execution of the program 1133. The instructions 1131 and the data 1132 are stored in memory locations 1128, 1129, 1130 and 1135, 1136, 1137, respectively. Depending upon the relative size of the instructions 1131 and the memory locations 1128-1130, a particular instruction may be stored in a single memory location as depicted by the instruction shown in the memory location 1130. Alternately, an instruction may be segmented into a number of parts each of which is stored in a separate memory location, as depicted by the instruction segments shown in the memory locations 1128 and 1129.

In general, the processor 1105 is given a set of instructions which are executed therein. The processor 1105 waits for a subsequent input, to which the processor 1105 reacts to by executing another set of instructions. Each input may be provided from one or more of a number of sources, including data generated by one or more of the input devices 1102, 1103, data received from an external source across one of the networks 1120, 1102, data retrieved from one of the storage devices 1106, 1109 or data retrieved from a storage medium 1125 inserted into the corresponding reader 1112, all depicted in FIG. 11A. The execution of a set of the instructions may in some cases result in output of data. Execution may also involve storing data or variables to the memory 1134.

The disclosed printing arrangements use input variables 1154, which are stored in the memory 1134 in corresponding memory locations 1155, 1156, 1157. The printing arrangements produce output variables 1161, which are stored in the memory 1134 in corresponding memory locations 1162, 1163, 1164. Intermediate variables 1158 may be stored in memory locations 1159, 1160, 1166 and 1167.

Referring to the processor 1105 of FIG. 11B, the registers 1144, 1145, 1146, the arithmetic logic unit (ALU) 1140, and the control unit 1139 work together to perform sequences of micro-operations needed to perform "fetch, decode, and execute" cycles for every instruction in the instruction set making up the program 1133. Each fetch, decode, and execute cycle comprises:

(a) a fetch operation, which fetches or reads an instruction 1131 from a memory location 1128, 1129, 1130;

(b) a decode operation in which the control unit 1139 determines which instruction has been fetched; and (c) an execute operation in which the control unit 1139 and/or the ALU 1140 execute the instruction.

Thereafter, a further fetch, decode, and execute cycle for the next instruction may be executed. Similarly, a store cycle may be performed by which the control unit 1139 stores or writes a value to a memory location 1132.

Each step or sub-process in the processes of FIGS. 1 to 10 is associated with one or more segments of the program 1133 and is performed by the register section 1144, 1145, 1147, the ALU 1140, and the control unit 1139 in the processor 1105 working together to perform the fetch, decode, and execute cycles for every instruction in the instruction set for the noted segments of the program 1133.

FIG. 5 shows a schematic representation of a printing system 500 according to the present disclosure in which functional components of the printing system 500 preferably implemented by the computer module 710 are delineated from the PDL inputs 515 and 510 and high-bandwidth pixel data outputs 720 supplied to a printer engine 585.

In FIG. 5, a print job control process 501 manages print rendering from end-to-end and is responsible for:

(i) managing the PDL input and swathe generation of one or more fillmap builder processes 530;

(ii) distribution of fillmap swathes for rendering a plurality of render hosts 590, each of which having a corresponding structure;

(iii) ensuring that fillmap swathes are rendered in the correct order;

(iv) monitoring data usage levels within a fillmap spool (memory) 540 and within rendered pixel framestores (memory) 560 of the render hosts 590; and (v) sending stop/start commands to a printer engine 585 or control of a number of print heads 580 thereof as appropriate according to data usage levels within a fillmap spool (memory) 540.

PDL Job Input

PDL input data 510 for a print job is input to the printer system 500 is typically configured for a multi-page document pre-imposed for a web-wide sheet. The PDL data 510 is loaded onto a PDL spool (memory) 520 formed in the memory 1106/1109 of the computer 710 prior to the start of job processing and can also be continually submitted once job processing has begun. The PDL spool 520 in this regard represents a last-in-first-out storage of PDL data for printing. PDL jobs can be loaded into the PDL spool 520 in any order, and the order of processing of the PDL spool data is not necessarily the same as the order of data input. The PDL spool 520 is typically formed in disk storage. The PDL data 510 is generated by a software application resident on a host computer module (not illustrated) which generates data, such as Adobe® PostScript® or Hewlett-Packard's Printer Command Language. The PDL data describes the objects to be printed. For example, a bitmap to be rendered and printed has an associated PDL representation. A host print manager, also being executed by a processor of the host computer module processes the PDL representation, before transmitting resulting data via a network to the printer system 500.

PDL data (for example, a PDL representation of a bitmap to be rendered), comprises PDL commands which is stored in a PDL data buffer configured in the memory 1106/1109 of the computer 710. The PDL data is streamed as one or more bitstreams into the PDL interpreter module formed in software and executable by the multi-processor 1105, which reads and interprets the PDL commands and creates lower level graphical objects suitable for rendering. These graphical objects are then processed by an object processor module which splits the graphical objects into object components and stores the object components in appropriate data stores formed within the memory 1106/1109. For example, bitmap objects are passed to the bitmap processor module, vector graphical objects are passed to the vector processor module and text objects are passed to the text processor modules.

Alternatively, PDL input data includes of multi-page documents where the pages need to be arranged on a web wide sheet.

The job control process 501 is updated with the PDL job details 515 once the job is in the PDL spool 520. The job control process 501, with knowledge of the web-width and print-head characteristics of the print engine 585, distributes instructions or layout parameters to the fillmap builder processes 530 on how to segment the input PDL data. The fillmap builder processes 530 can then use the distributed information to correctly divide or segment the input PDL file 510 into print-head-width (or swathe-width) output fillmaps.

To calculate the parameters that produce correctly aligned print head swathes, the job control process 501 requires knowledge of the printer geometry. This includes the width 445 of the printable web 410, offset between the printable web and pages on the printable web, the number, width 450, and overlap of the print heads 431-434. The parameters can be input by the user, coded as part of the software or stored in a printer configuration file read by the printing system. Alternatively, the parameters can be collected from press printer engine 1115. This example will be shown below in Example 1.

Figure 16:
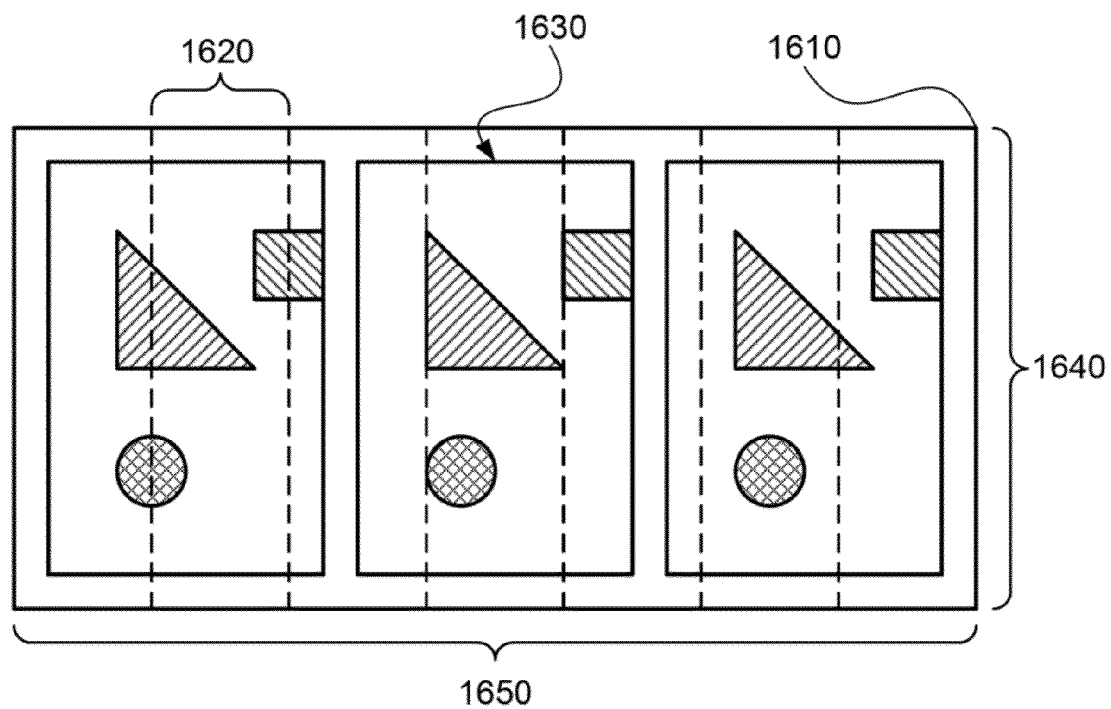
FIG. 16 illustrates the layout of imposed pages on a web, and the effect of swathing.

Given the printer geometry and each page size defined by the input PDL, the swathe locations and size can be calculated. PDL data may be web-width, but it cannot be arbitrarily long due to memory and rendering constraints. In FIG. 16, it is expect that web-width 1650 corresponding to input PDL jobs 1610 will be a finite length (height) 1640 equal to the height of imposed pages 1630, plus additional vertical space for imposition and cut marks and suitable space between pages. The division of the input PDL into swathe segments 1620 is shown. Three pages 1630 are arranged in a row on the web 1610.

In the exemplary implementation, the input PDL file 510 is segmented by the fillmap builder processor 530 based on the received layout parameters, and the segmented PDL is converted to fillmaps for rendering by the render hosts 590. In another implementation, the input PDL is converted to a full fillmap, and the full fillmap is divided into swathe-width output fillmaps. The number of output fillmaps is dependent on the number of print heads available on the high speed digital press. In particular, during the segmentation of the full fillmap, the full fillmap is altered by adding additional pixel-aligned edges and associated fills along the boundaries of the swathes, so that the swathes can be rendered independently of one another by a corresponding render host 590. In preferred implementations, the number of render hosts 590 correspond to the number of swathes and associated groups of print head(s) formed in the printer engine 585. As such, implementation of the arrangements described herein requires determining or at least identifying a number of print heads on a printer targeted for printing said print job. Typically this will be known or can be determined from parameters of the print engine to which a particular print job is directed for printing.

Fillmap Building

The builder processes 530 read PDL files from the PDL spool 520. The PDL files are interpreted, and, based on the job instructions from the job control process 501, the builder process 530 produces an intermediate job in an intermediate page representation. In an exemplary implementation, the intermediate job in the intermediate page representation is stored to the fillmap spool 540, for example in the memory 1106/1109, as a fillmap file.

A fillmap representation of a page as an intermediate page representation will now be described in more detail. A fillmap is a region-based representation of a page. The fillmap maps a fillmap region of pixels within the page to a fill sequence which will be composited to generate the colour data for each pixel within that fillmap region. Multiple fillmap regions within a fillmap can map to the same fill sequence. Fillmap regions within the fillmap do not overlap (i.e. they are non-overlapping fillmap regions) and hence each pixel in the rendered page can only belong to a single fillmap region. Each fillmap region within the fillmap is defined by a set of pixel-aligned fillmap edges which activate the fill sequence associated with that fillmap region. Pixel-aligned fillmap edges:

(i) are monotonically increasing in the y-direction of the page;

(ii) do not intersect;

(iii) are aligned with pixel boundaries, meaning that each pixel-aligned fillmap edge consists of a sequence of segments, each of which follows a boundary between two contiguous pixels;

(iv) contain a reference field referring to the index of the fill sequence, within the table of fill sequences, required to be composited to render the fillmap region, to which the pixel-aligned fillmap edge belongs, to pixels; and (v) activate pixels within a single fillmap region.

On any given scanline (i.e. y being constant), starting at a pixel-aligned fillmap edge which activates a fillmap region, and progressing in the direction of increasing x, the fillmap region remains active until a second pixel-aligned fillmap edge which activates a further fillmap region is encountered. When the second pixel-aligned fillmap edge is encountered, the active fillmap region is deactivated, and the fillmap region corresponding to the second pixel-aligned fillmap edge is activated.

Within a fillmap, the fill sequence active within each fillmap region of pixels is stored in a table of fill sequences 1440, seen in FIG. 14, also formed in the memory 1106/1109. A fill sequence is a sequence of z-ordered levels, where each level contains attributes such as a fill, the opacity of the level, a compositing operator which determines how to mix the colour data of the level with other overlapping levels, and the priority, or z-order, of the level. A fill sequence contains references to all the levels which may contribute colour to the pixels within a fillmap region. The table of fill sequences contains all of the fill sequences required to render the page to pixels. The table of fill sequences does not contain duplicate instances of identical fill sequences. Hence, multiple fillmap regions 1421, 1422, 1423 within a fillmap which map to the same fill sequence, map to the same instance of the fill sequence 1440a within the table of fill sequences 1440.

Figures 8A, 8B:
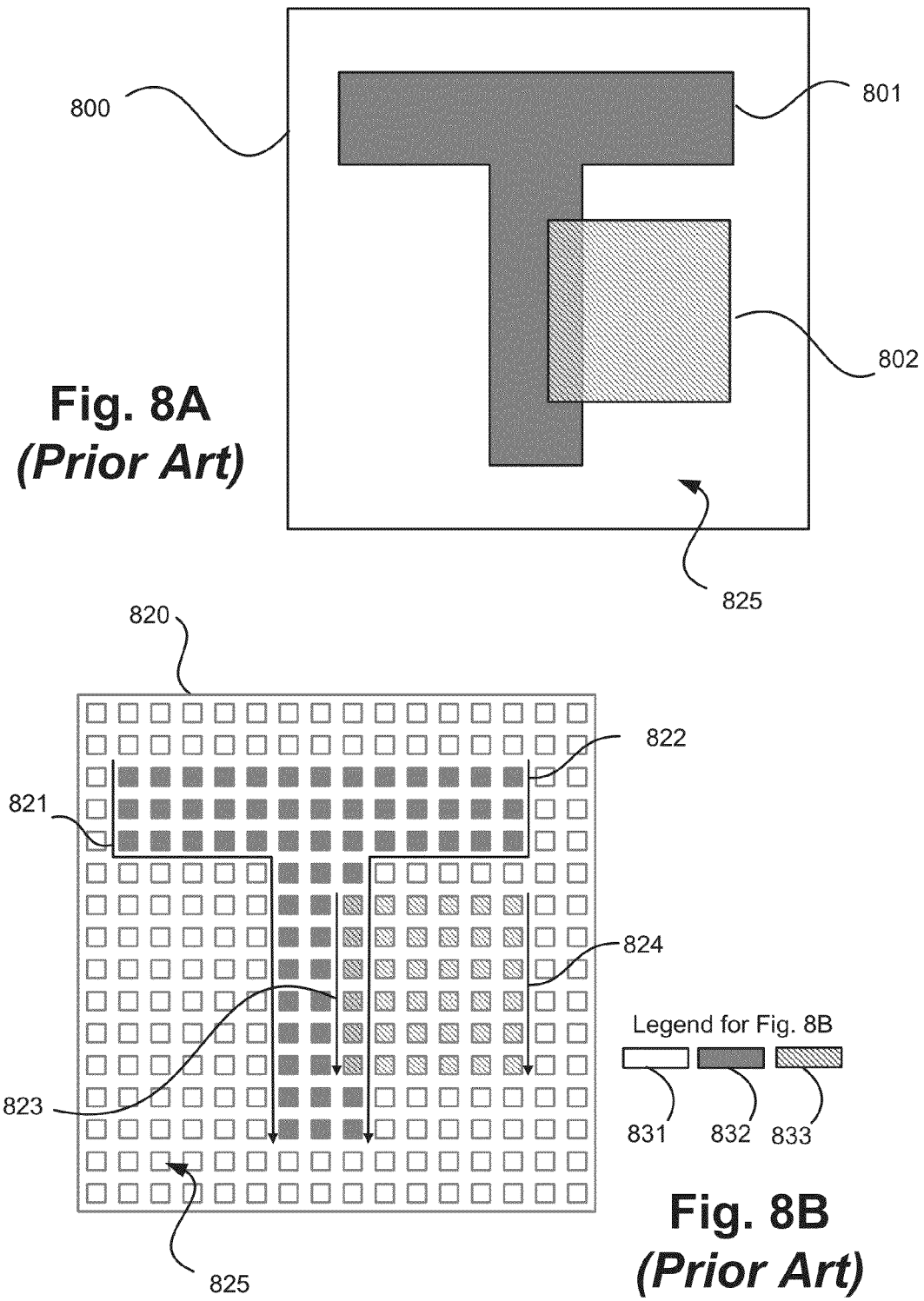
FIG. 8A shows a display list representation of a page.
FIG. 8B shows the pixel-aligned object edges, and their associated fills, of the page which is represented in FIG. 8A.

The generation of a fillmap representation of a page will now be described with reference to FIGS. 8A to 8D. FIG. 8A shows a page representation 800. The page 800 has a white background 825 over which all page objects are to be rendered. The page 800 contains two page objects 801 and 802. The first page object 801 is an opaque "T" shaped object with a grey flat fill. The second page object 802 is a semi-transparent square with a hatched fill. Examples of other fills include blends representing a linearly varying colour, bitmap images and tiled (i.e. repeated) images. As can be seen, the second page object 802 partially overlaps the first page object 801, and by virtue of the semi-transparency of the page object 802, the page object 801 can be seen through the overlapping portion.

FIG. 8B shows a decomposition of the page objects into pixel-aligned object edges, levels, and fills, of FIG. 8A according to a pixel grid 820. A page object is decomposed into two or more pixel-aligned object edges, a single level, and one or more fills. Pixel-aligned object edges define the activation or deactivation of a level during rasterization. Rasterization is the name given to a process that determines the colours of the pixels of an image or page, during image or page generation using graphic object based data. Rasterization involves determining pixel values typically for each sequential location along a scan line of a page and progressively for each scan line of the page. This results in the generation of pixel data in a rasterized image format. Pixel-aligned object edges therefore refer to the level of the object from which they are derived. As illustrated, the first page object 801 is decomposed into two pixel-aligned object edges 821 and 822, and a level 832 that consists of a grey flat fill. Pixel-aligned object edges 821 and 822 refer to the level 832 of the first page object 801. The second page object 802 is decomposed into two pixel-aligned object edges 823 and 824, and a level 833 that comprises a transparent hatched fill. Pixel-aligned object edges 823 and 824 refer to the level 833 of the second page object 802. The background 825 has a level 831 that consists of white fill. The levels 831, 832, and 833 are represented by shading, as shown in a legend in FIG. 8B.

Figure 8C:
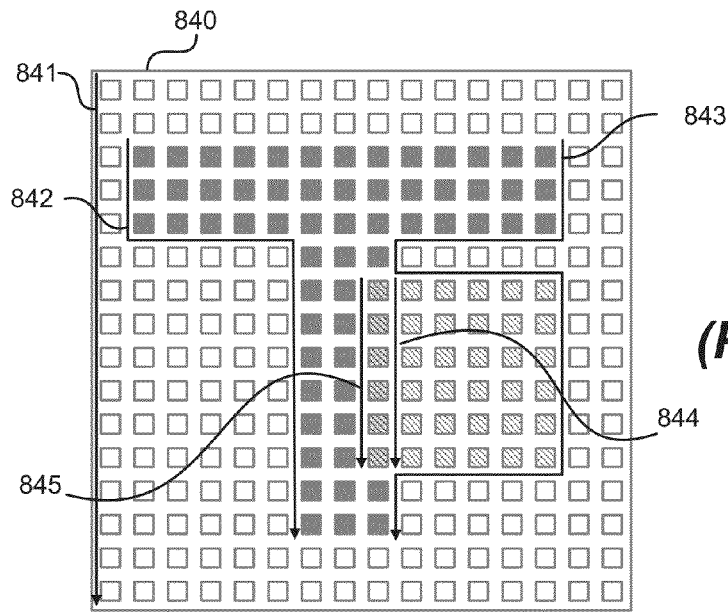
FIG. 8C shows a fillmap representation of the page which is represented in FIG. 8A.

FIG. 8C shows a fillmap representation 840 of the page represented in FIG. 8A. The fillmap representation is composed of five pixel-aligned fillmap edges. Each pixel-aligned fillmap edge references a fill sequence which will be used to determine the colour of each of the pixels activated by that pixel-aligned fillmap edge. On any given scan line on which a pixel-aligned fillmap edge is active, the pixel-aligned fillmap edge will activate those pixels which are immediately to the right of the pixel-aligned fillmap edge, until the next pixel-aligned fillmap edge or a page boundary is encountered. The first pixel-aligned fillmap edge 841 traces the left hand boundary of the page, and references a fill sequence 851 which contains a single opaque level which is to be filled using the fill for the background 825. The second pixel-aligned fillmap edge 842 traces the left hand boundary of the first object 801, and references a fill sequence 852 that contains a single level which is opaque and is to be filled using a grey flat fill. The third pixel-aligned fillmap edge 843 references the same fill sequence 851 as the first pixel-aligned fillmap edge 841. The fourth pixel-aligned fillmap edge 844 traces the left hand boundary of the region where the second object 802 overlaps the white background. The fourth pixel-aligned fillmap edge 844 references a fill sequence 854 which contains two levels. The top most level is transparent and is to be filled using a hatched fill. The bottom most level is opaque and is to be filled using the background fill. The fifth pixel-aligned fillmap edge 845 traces the left hand boundary of the region where the second object 802 overlaps the first object 801. The fifth pixel-aligned fillmap edge 845 references a fill sequence 853 which contains two levels. The top most level is transparent and is to be filled using a hatched fill. The bottom most level is opaque and is to be filled using a grey flat fill.

Figure 8E:
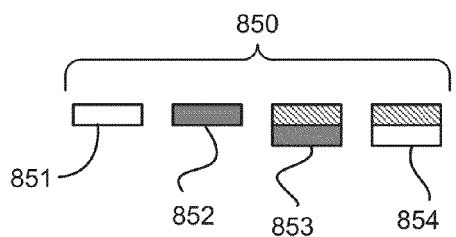
FIG. 8E is a table of fillmap sequences for the fillmap representation of FIG. 8C.

Accompanying the fillmap representation 840 of the page, and shown in FIG. 8E, is a table 850 of fill sequences which contains the fill sequences 851, 852, 853 and 854 referenced by the pixel-aligned fillmap edges contained in the fillmap representation 840 of the page.

Figure 8D:
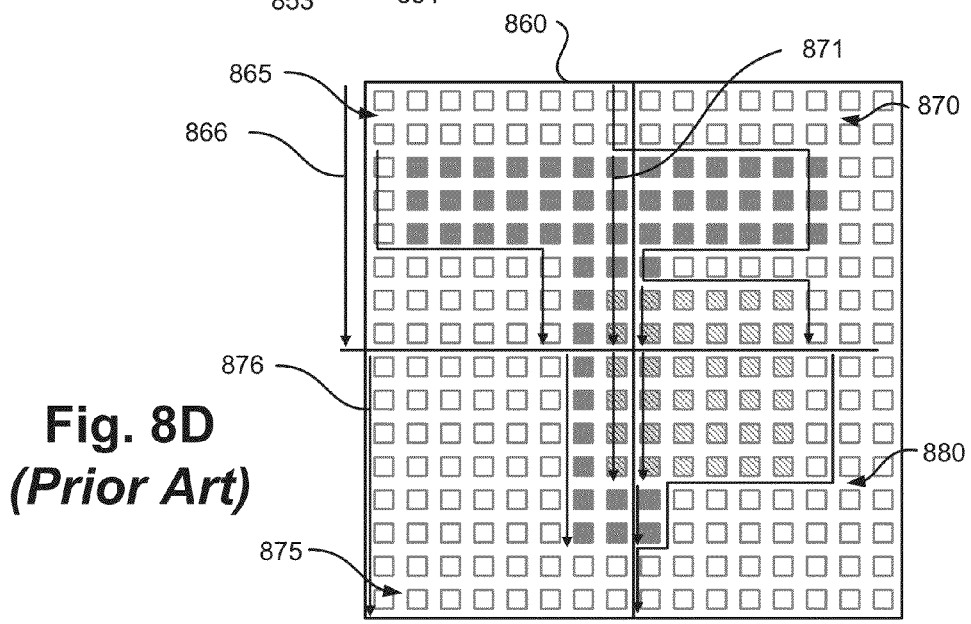
FIG. 8D shows a tiled fillmap representation of the page which is represented in FIG. 8A.

FIG. 8D shows a tiled fillmap representation 860 of the page represented in FIG. 8A. The tiled fillmap contains four tiles 865, 870, 875 and 880. Each tile has a height and width of eight pixels. In order to generate the tiled fillmap representation 860 of the page, the pixel-aligned fillmap edges of the original fillmap representation 840 have been split across tile boundaries. For example, the pixel-aligned fillmap edge 841, which traces the left hand boundary of the page in the un-tiled fillmap representation 840 shown in FIG. 8C, has been divided into two pixel-aligned fillmap edges 866 and 876. The first pixel-aligned fillmap edge 866 activates pixels in the top-left hand tile 865, while the second pixel-aligned fillmap edge 876 activates pixels in the bottom-left hand tile 875. Also, new pixel-aligned fillmap edges have been inserted on the tile boundaries to activate the left most pixels of each tile which were previously activated by a pixel-aligned fillmap edge in a tile to the left of the tile in which the pixels reside. For example, in the top-right hand tile 870, a new pixel-aligned fillmap edge 871 has been inserted to activate pixels which were activated by the pixel-aligned fillmap edge 842 which traces the left hand boundary of the first object 801 in the original fillmap representation 840 shown in FIG. 8C.

Figure 2A:
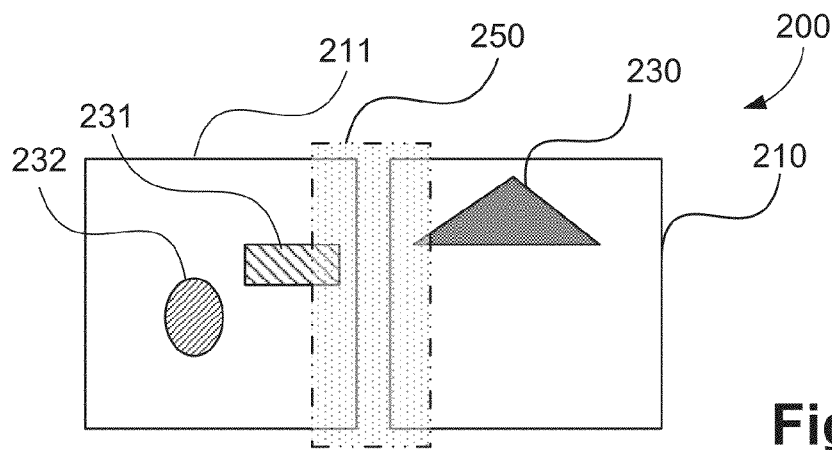
FIGS. 2A-2C schematically illustrate the relationships between page placement on the web and some of the different swathe alignment possibilities.
Figure 2B:
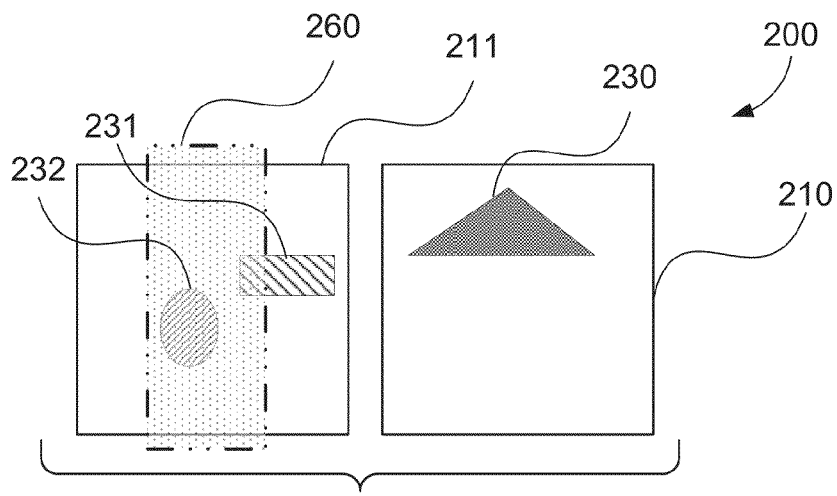
Figure 2C:
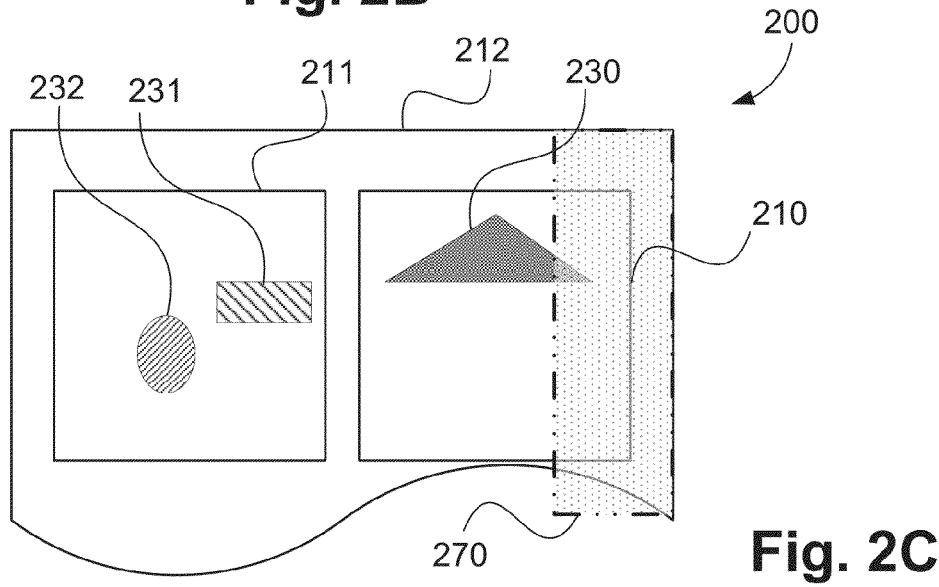
Figure 3:
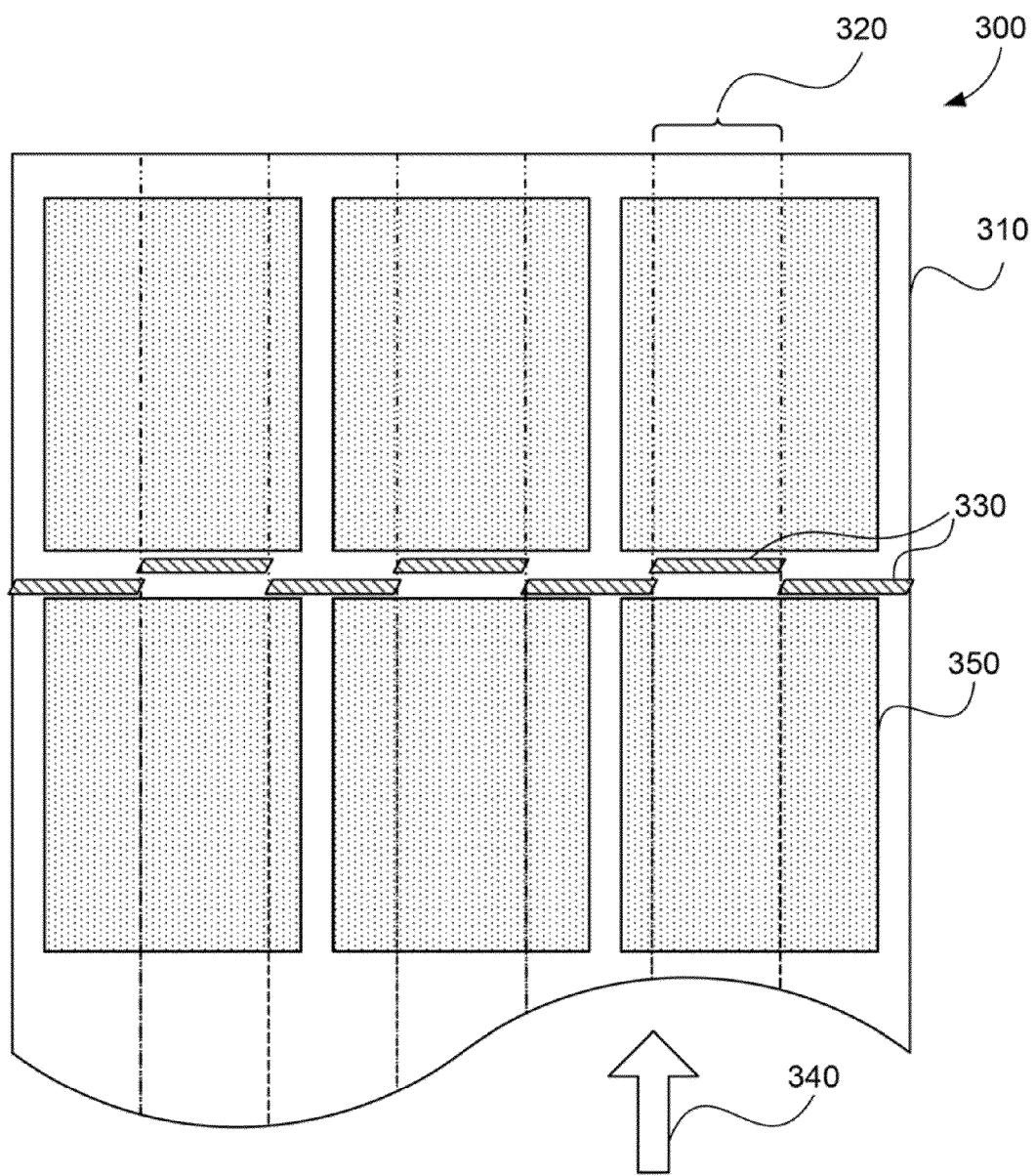
FIG. 3 is a schematic block diagram illustrating the layout of print-heads and pages on a black and white digital press web.

Returning now to FIG. 4, and also to FIGS. 2A to 2C, depending on the size and layout of individual output pages 460 imposed on the print-web 410 and the number and arrangement of print-heads 431-434 (one print head for each colour in FIG. 4) across the web, page objects 230-232 present on a printable page, seen in FIG. 2A, are split into multiple fillmap swathes targeted at different print heads. For example, if there are seven sets of print heads, the print-web is split into seven fillmap swathes as shown in FIG. 4.

Where the input PDL consists of multiple pages requiring imposition onto a web, the positions of the pages on the web are calculated according to relevant page placement rules. Examples of such rules may be that no page shall be closer than 5 mm to the edge of the web and that there should be a 5 mm separation between pages. These rules afford appropriate space for page separation and trimming FIGS. 3 and 4 show examples of page placement on a web. In FIGS. 3 and 4, three pages are formed in every row on the web 310.

Next the size and offset of each swathe is calculated so a swathe-sized clip can be created. A clip defines the bounds of the area to be rendered. A swathe-sized clip (or swathe-clip) in this case defines the bounds of the swathe-sized area of the web-wide sheet that needs to be rendered. For every swathe-clip 250,260,270, seen in FIGS. 2A-2C respectively, pages that each swathe-clip covers (or encompasses) are identified. The offset position on the web of each page that is covered by a clip, is calculated relative to the clip such that when the swathe-clip fillmap is finally rendered, the pixels are located correctly on the web, and pixels for adjacent swathe-clips are correctly aligned.

PDL layout instructions are produced that describe the clip and the layout of the pages concerned and are included in the PDL job details of FIG. 5. The layout instructions are given to the fillmap builder 530 by the job control process 501 and a fillmap representing the corresponding swathe is produced and written to the fillmap spool 540.

Figure 9:
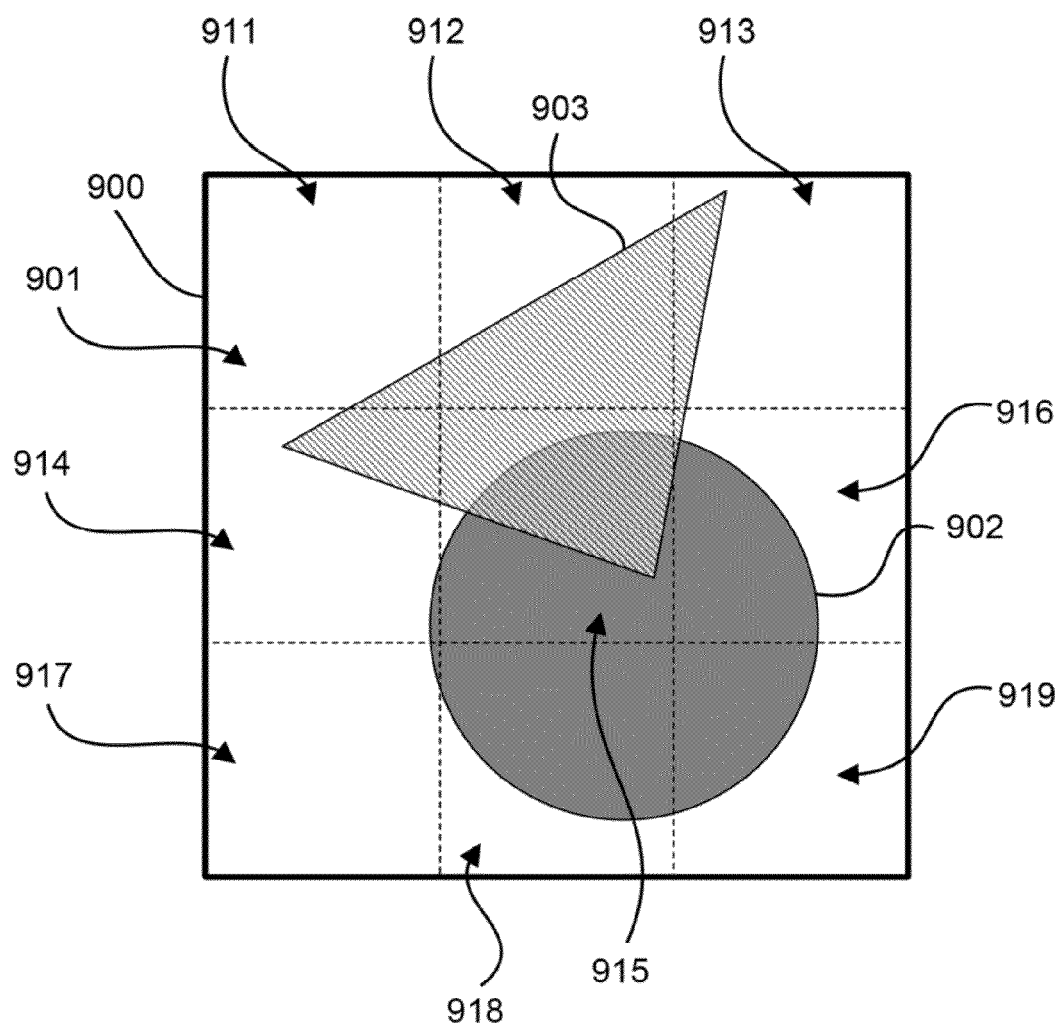
FIG. 9 shows a page representation containing page objects and a division of the page representation into nine disjoint regions.

In an exemplary implementation of the fillmap building process, FIG. 9 shows a page representation 900 containing page objects. These page objects include a white background 901, a circle 902 with a grey flat fill, and a triangle 903 with a hatched fill. The triangle 903 with the hatched fill is semi-transparent and has a higher priority than the circle 902 with the grey flat fill. In addition, the triangle 903 with the hatched fill partially overlaps the circle 902 with the grey flat fill.

FIG. 9 also shows a division of the page representation 900 into nine disjoint, but immediately adjacent, regions 911-919. In an exemplary implementation, the page representation 900 is divided into square regions of equal size. Alternatively, regions may be of any shape, and the page representation may be divided into regions of different shapes and sizes, provided the page representation is completed accommodated by the regions. Preferably, the region size is an integer multiple of the fillmap tile size.

Figure 10:
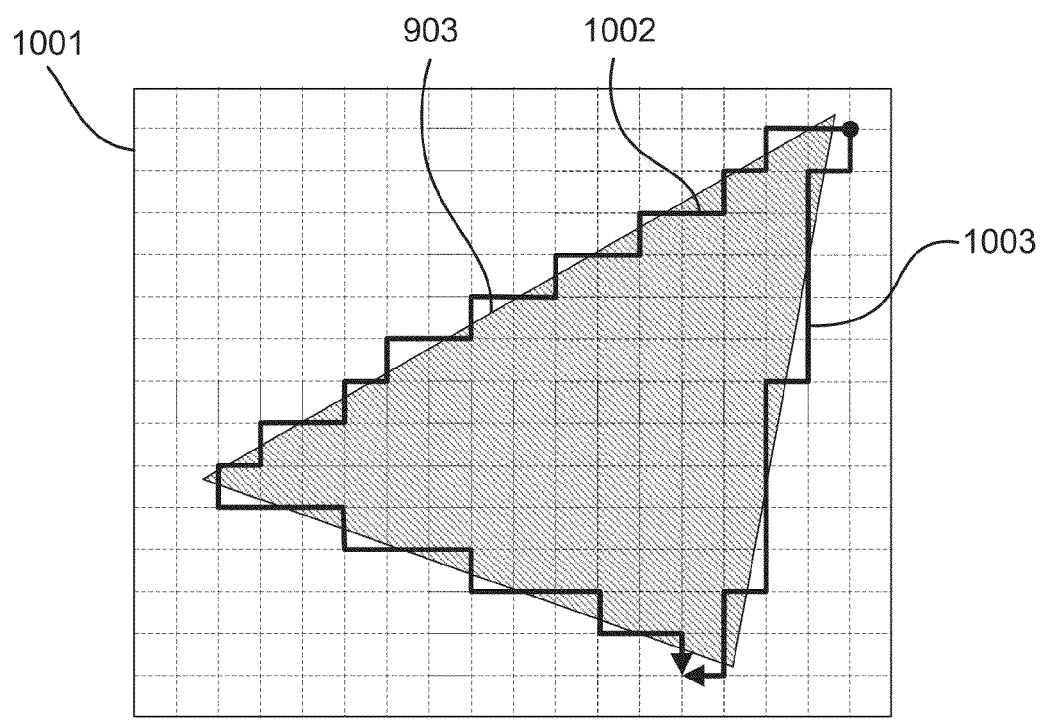
FIG. 10 shows the generation of pixel-aligned object edges of an object according to a pixel grid.
Figure 10:
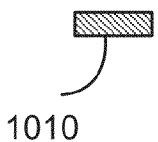

FIG. 10 shows the scan-conversion of the page object 903 according to a pixel grid 1001. During the scan-conversion of the page object 903, pixel-aligned object edges 1002 and 1003 are generated. Pixel-aligned object edge 1002 traces the left hand boundary of the page object 203, and references a level 1010 with a hatched fill. Pixel-aligned object edge 1003 traces the right hand boundary of the page object 903, and also references a level 1010 with a hatched fill. Pixel-aligned object edge 1002 defines the activation of the level 1010 associated with this page object 903 during scan line processing from left to right. Pixel-aligned object edge 1003 defines the de-activation of this level 1010 during scan line processing from left to right.

Referring back to FIG. 2B, where the clip encompasses an entire elliptical page object 232, the complete fillmap for that page object is produced as described with reference to FIG. 9 and FIG. 10. Where the clip splits the rectangular page object 231 as seen in FIG. 2A, a partial fillmap for that page object is produced. In this instance, the partial fillmap is an altered intermediate format with a different set of pixel aligned edges and associated fills compared to the fillmap of a whole rectangular page object 231. In other words, the builder process 530 executing on the processor 1105 alters the fillmap by adding pixel aligned edges and associated fills to the partial fillmap so that the partial fillmap is used by the render host 590 to render the fillmap independently of other partial fillmaps. As illustrated in FIG. 2A, the clip 250 encompasses multiple pages 210 and 211. In such an instance, a single fillmap file is built by the processor 1105 which contains the included page elements from both of those pages.

FIG. 2C shows an example where the input PDL consists of pages imposed upon a web-width PDL 212. The pages 210 and 211 are arranged in a row on the web 212. Each and every swathe 270 is just a segment from the input PDL regardless of where swathe 270 lies on the web 212. The fillmap builder 530 creates the swathe-sized clip and merely needs to apply an offset to the web-wide PDL to account the relative placement of the swathe-clip. The fillmap builder 530 then produces the fillmaps and writes the active objects to disk.

Page objects that contain references to external input such as fonts resources, global objects or reusable objects in a Personalised Print Markup Language (PPML) format, or images are converted to the intermediate format that incorporates the external inputs. Thus, the intermediate format is renderable independent of the external input. In the exemplary implementation, the page objects that typically require external resources such as fonts are processed and stored in the fillmap in a format that is independent of external resources.

Swathe fillmaps are written to the fillmap spool 540 and are uniquely identifiable. Once fillmaps are produced, the fillmap builder process 530 notifies the job control process 501 of task completion.

Fillmap Combining

Alternatively a web-wide fillmap can be produced from individual page fillmaps without having to pre-impose the pages in a PDL. For simplicity this technique will be exemplified by showing only a two-page imposition. In practice, any number of page fillmaps can be applied to this process.

Figure 12A:
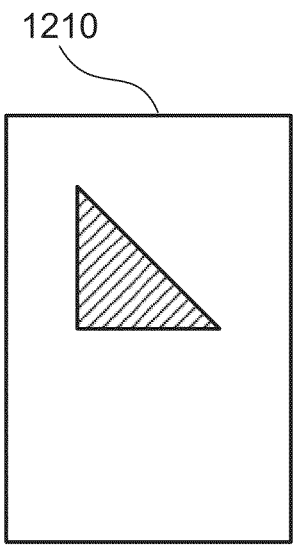
FIGS. 12A to 12D show two PDL pages and the tile fillmaps produced from these pages.
Figure 12B:
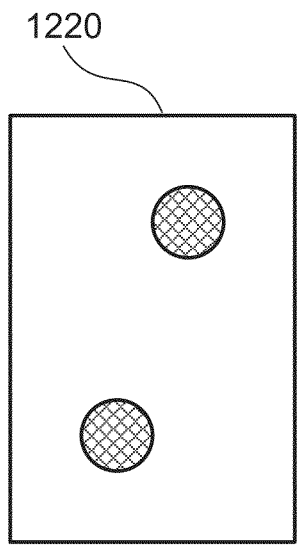
Figure 12C:
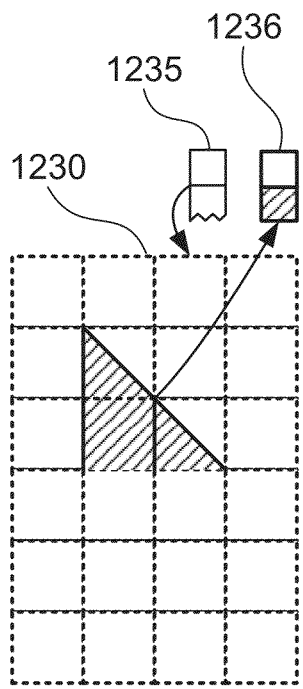
Figure 12D:
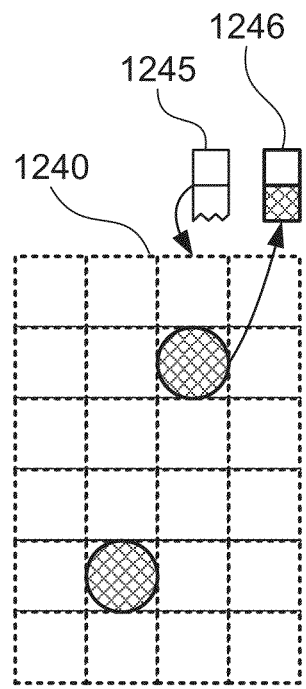

FIGS. 12A and 12B show two PDL pages 1210, 1220, respectively, and FIGS. 12C and 12D show the tile fillmaps 1230, 1240, respectively, produced from these pages and the associated fillmap header 1235, 1245 to reference tiles and fill data store 1236, 1246 having fill data like colour and transparency ($\alpha$). The fillmaps may have been produced individually or concurrently as previously described.

Figure 13:
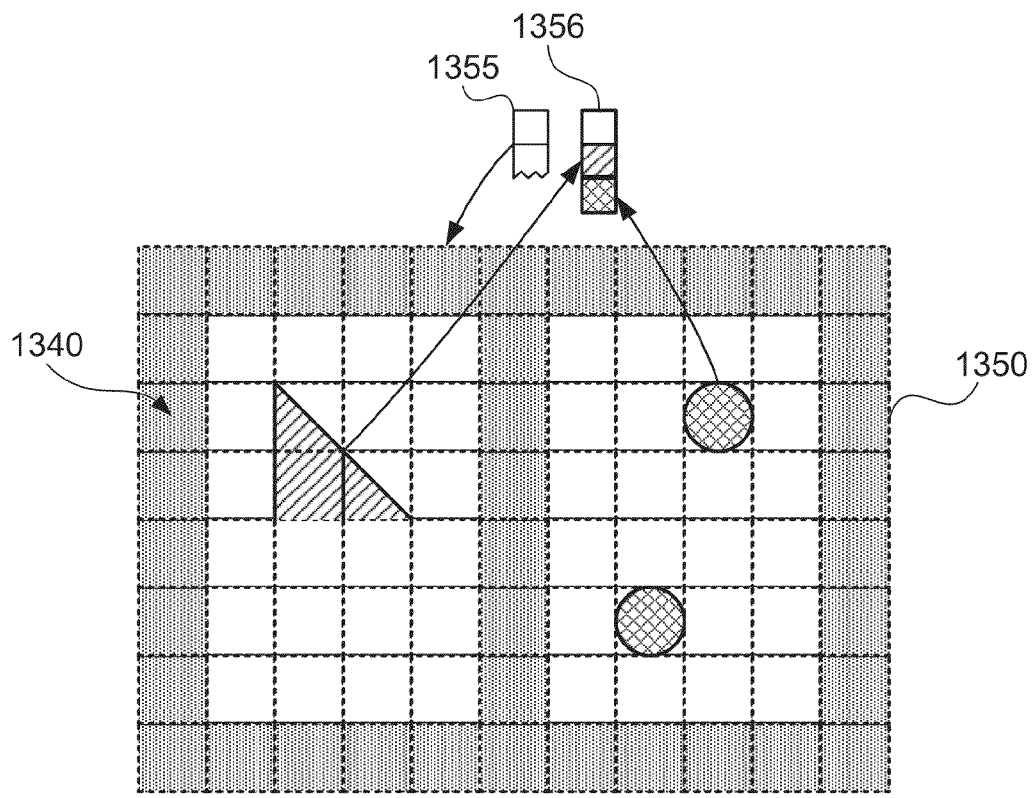
FIG. 13 shows a web-wide fillmap from individual page fill maps.

Individual page fillmaps (two page fill maps) can be combined into a web-wide fillmap (a web wide intermediate job) as shown in FIG. 13. The page fillmaps are imposed on a web-wide fillmap 1350. Extra empty fillmap tiles 1340 for the offset between width of the web and two pages (two page fillmaps), shown by the shaded tiles, are virtually created between and around the page fillmaps to provide the correct imposition layout. The fillmap headers to reference tiles in each page fillmap are combined into a single fillmap header 1355 representative of the web-wide sheet. These empty fillmap tiles are created before a plurality of swathe fillmap The virtual placement is achieved by arrangement of the existing entries in the fillmap header 1355 and the addition of extra entries that indicate an empty or blank tile location without having to actually produce an empty tile and make reference to it. The fill data stores of the two separate page fillmaps are combined into a single fill data store 1356 with fills for the entire web-wide sheet 1350.

Fillmap Swathing

Figure 14A:
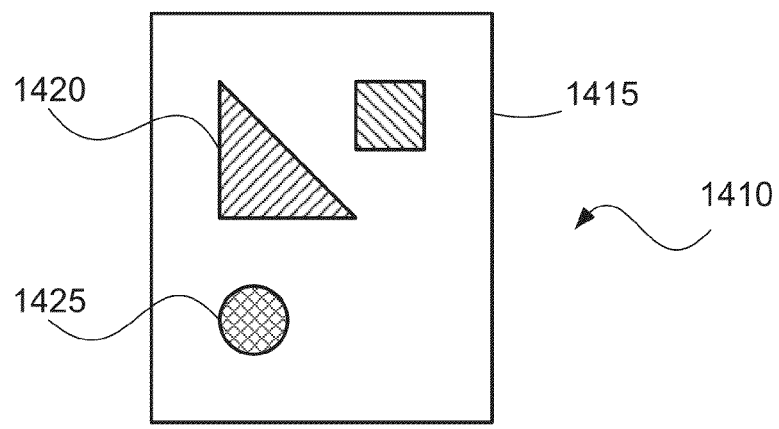
FIGS. 14A, 14B and 14C illustrate the process by which multiple fillmaps are produced for a single input PDL.
Figure 14B:
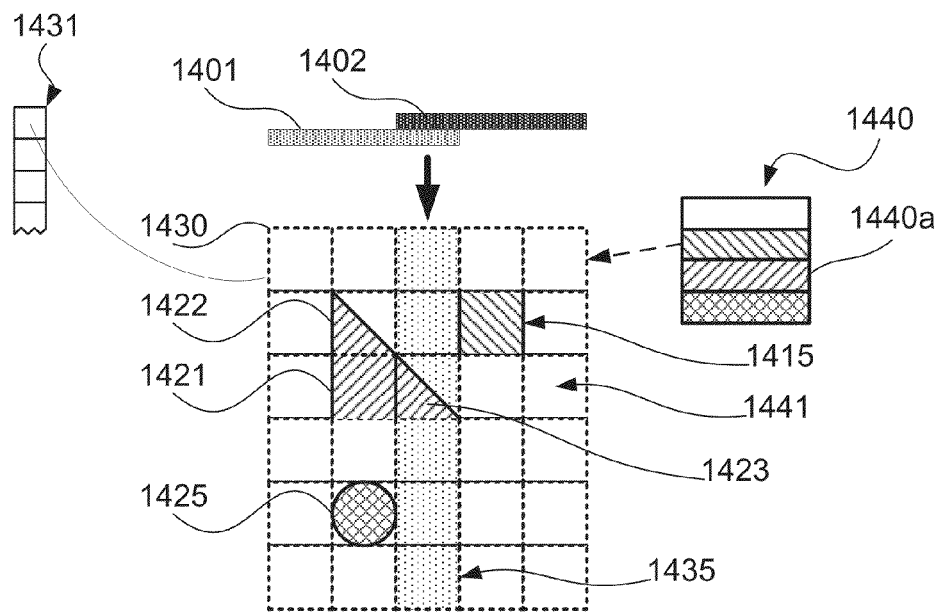
Figure 14C:
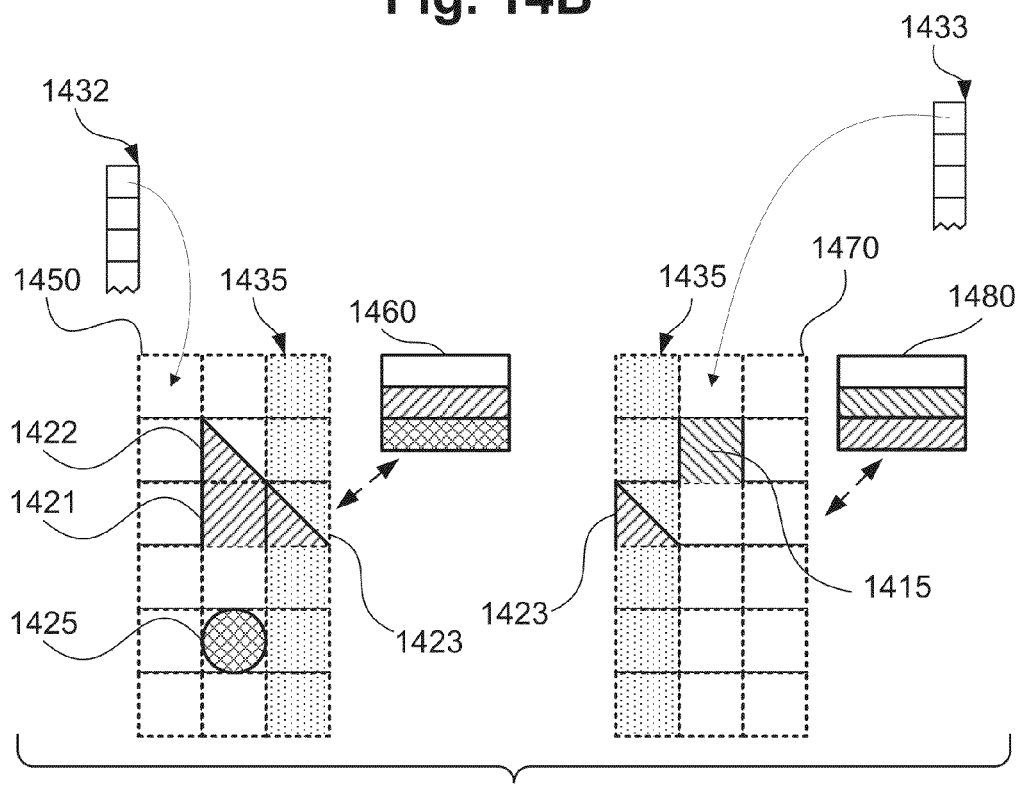

FIGS. 14A to 14C illustrate fillmap swathing where the input PDL is a full web-wide PDL. Alternatively, the input PDL may be multiple pages PDL to be combined. While the arrangements presently disclosed are applicable to any number of divisions of a fillmap, dividing one fillmap into two swath fillmaps (being a plurality of adjacent intermediate jobs) is illustrated for simplicity. The PDL is first fully converted to a web-width fillmap like the web-wide fillmap 1350 in FIG. 13 and associated fill sequences. Alternatively, the multiple page PDLs are combined to create a web-wide fillmap like FIG. 22. Swathe layout information is passed to the fillmap building process to specify the size and offset of each swathe on the web-wide PDL. In specifying this information, the controlling process accounts for the swathe print-head overlapping by specifying overlapping swathe sections of the input PDL.

As seen in FIG. 14A, an input PDL 1410 has graphics objects 1415, 1420, 1425, each of which have a different fill as shown. The PDL page 1410 is first interpreted and processed into a fillmap 1430, seen in FIG. 14B. Graphics objects are segmented and replaced with edges and fills when the fillmap tiles are produced. For example, the triangular object 1420 covers three tiles, during fillmap construction this object is replaced by edge in the fillmap tiles 1421, 1422, 1423. The edges in the fillmap tiles reference fill sequences, which include compositing information and fill data, in the fill data store 1440. Objects 1415 and 1425 fall wholly within a tile and as such are not segmented, but are however converted to edge data and fill sequences.

Due to the need to deliver pixel data from different swathes to associated print heads, the web-wide fillmap is divided into swathe width fillmaps along fillmap tile boundaries without the need to re-interpret the input PDL. This approach of segmenting whole fillmaps is advantageous since it avoids the performance penalty that comes with the re-interpretation of the input PDL associated with the previous method.

It is a fact of multi-head digital presses that the individual print-heads overlap by a small amount. A consequence of this is that the data delivered to these print-heads is also required to overlap by a small amount. For simplicity, in this description, the print heads 1402, 1402 are shown to overlap by precisely one single fillmap tile width. The shaded fillmap tile column 1435, seen in FIG. 14C, represents the tiles that are overlapped and are required for both of the swathe fillmaps. It should be apparent that the width of overlap depends on exactly how much two print-heads actually overlap in any implementation. In all likelihood the overlap will be several fillmap tile widths.

Fillmap tiles exist as data structures in computer memory. Each tile is individually referenced in a fillmap header in memory. The process of segmenting a fillmap into swathes is performed on fillmap tile boundaries. The swathe fillmaps 1450, 1470, seen in FIG. 14C, are created from the original fillmap 1430 by identifying, based on printer geometry, the swathe fillmap segments. This process also involves identifying any fillmap tiles that are present in both swathes as a result of the overlapping of the print-heads.

The overlapped region 1435 can be duplicated when dividing the fillmap 1430 so that a copy of the overlapped region is present in memory for both fillmaps 1450, 1470. The copied region along with any of the other divided tile regions all need to be made to point to their associated fill data store.

Alternatively, to save some memory and time, the divided fillmaps 1450, 1470 can be made to refer to the same overlapped region of tiles 1435 without copying the tiles. As each fillmap is written to the fillmap store, the edge data in the overlapped tiles 1435 are updated to refer to the correct fill sequence in the associated fill data store prior to being written.

New fillmap headers 1432, 1433 to reference tiles and fill data stores 1460, 1480 having fill data like colour and transparency (a) are created for each new fillmap swathe 1450, 1470 to be defined. The new fillmap headers 1432, 1433 are updated to reference the appropriate tiles for each respective fillmap swathe 1450, 1470. Next, each edge in each tile of each swathe fillmap 1450, 1470 is updated to refer to the appropriate fill sequence in the associated fill data stores 1460, 1480.

The new fillmap headers 1432, 1433 and associated fill data stores 1460, 1480 of the respective swathe fillmaps 1450, 1470 shown in FIG. 14C can be created and populated from new by extracting appropriate entries from the original fillmap header 1431 and fill data store 1440, shown in FIG. 14B. The extracted entries correspond to the each swathe fill map. Alternatively the new fillmap headers and fill data stores can be created by first duplicating the original fillmap headers and fill data store, then removing any references or fill sequences that are not used by the swathe fillmap in order to minimize the number of fill sequences stored with the swathe fillmap.

FIG. 14C also illustrates the resulting fillmap swathes 1450, 1470. The large graphic object 1420 has been converted to edge data and is present on several fillmap tiles. Due to the overlapping of the print heads, fillmap tile 1423 and its associated edge data are present in both swathe fillmaps 1450, 1470. Since the edge data of tiles 1421, 1422, 1423 all have the same fill, the fill sequence is present in both fill data stores 1460, 1480. The edge data for the circular graphic object 1425 is only present on swathe 1450 and as such its fill sequence is only present in the fill data store 1460. Likewise the edge data for the square graphics object 1415 is only present in swathe 1470 so its associated fill sequence is only present in fill data store 1480. This process ensures that the segmented fillmaps are now independent of each other and external resources.

Non Tile-Aligned Swathes

Figure 15A:
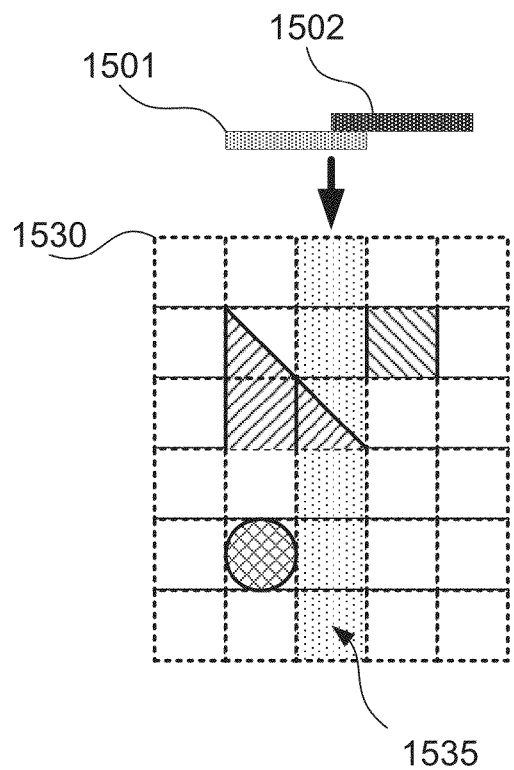
FIGS. 15A and 15B illustrate the case where fillmap tile boundaries and print-head swathes are not aligned.
Figure 15B:
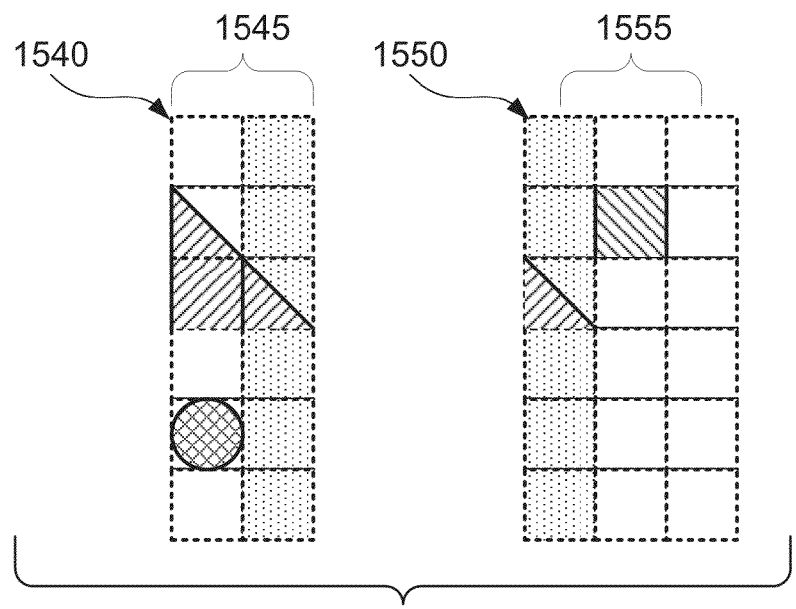

FIGS. 15A and 15B illustrate what happens when the print-head swathe and the fillmap tile boundaries are not in alignment. In FIG. 15A, print-heads 1501, 1502 which are next to each other are of equal size and overlap each other at fillmap tile column 1535. Print-head 1501 is aligned with fillmap tile boundaries and the swathe fillmap produced for print-head swathe 1501 is shown at 1540. The printable part of the swathe fillmap 1540 is shown to be the whole width 1545 of the swathe fillmap.

Print-head 1502 however does not precisely align with any fillmap tile boundary. The swathe fillmap 1550 built for print-head swathe 1502 is constructed such that all the tiles necessary to provide data for the print-head 1502 are present in the fillmap even if all the tile data will not necessarily be used. The printable part of the swathe fillmap 1550 is shown to be the section indicated by 1555.

As seen in FIG. 15B, rendering for swathe 1540 proceeds as normal, the fillmap tiles are rendered and the pixel data is written to the framestore for delivery to the print head. Swathe fillmap 1550 is also rendered normally, however the swathe size and offset information is passed to the renderer. The renderer will then only output the pixels that are part of the swathe segment 1555 to the framestore to be delivered to the print head.

Alternatively, the swathe fillmap 1550 is rendered in its entirety and the engine controller is configured to output only the pixels from each scanline that correspond to the print-head swathe.

Figure 17:
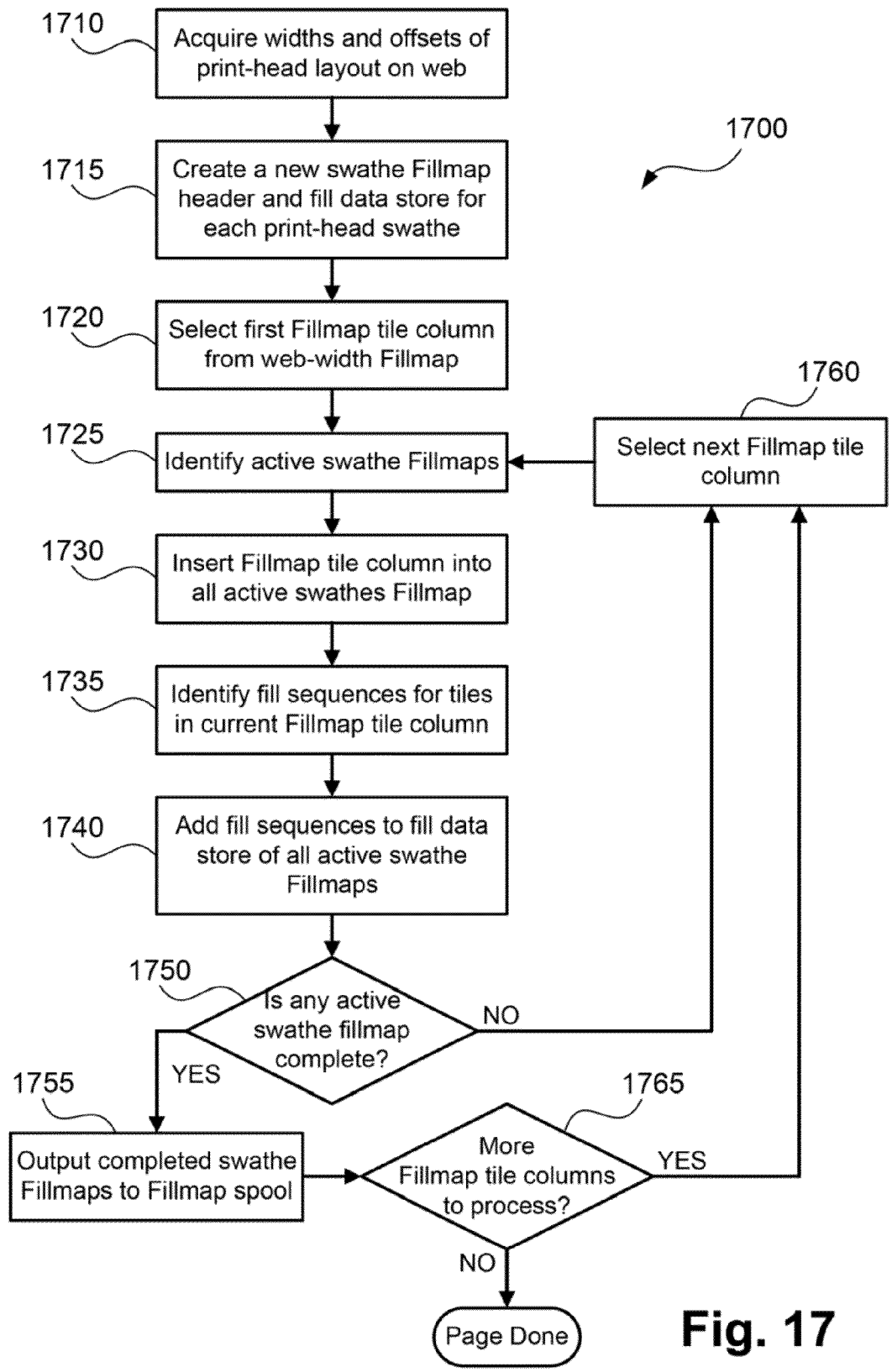
FIG. 17 is a flowchart illustrating the process by which a single web-wide Fillmap is divided into multiple swathe Fillmaps.

FIG. 17 is a flowchart illustrating the process 1700 by which a single web-wide Fillmap is divided into multiple swathe Fillmaps based on the positions of the print-heads relative to the web-wide Fillmap. The input is web-wide Fillmap data and the locations and offsets of the print-heads which define the swathes. This process is applicable to generation of swathe fillmaps for both tile-aligned and non-tile-aligned swathes. The flowchart of FIG. 17 is performed by the processor unit 1105 of the computer system 1100 of FIG. 11A which executes software 1133 loaded from the memory 1106 as a series of steps.

Widths and offsets of the print-head swathes are acquired in step 1710 either from a configuration file, command line input, network command or part of the application program. A new swathe Fillmap header and an associated fill data store are created in step 1715 for each swathe defined. The input web-width Fillmap data is processed one Fillmap tile column at a time. FIG. 14 illustrates a Fillmap tile column 1435 in the context of a larger Fillmap 1450, 1470. The first Fillmap tile column of the input web-wide Fillmap is selected in step 1720. Each active fillmap corresponding to each print-head is identified in step 1725. The selected Fillmap tile column is added to each active swathe Fillmap in step 1730.

With reference to FIG. 14, an active swathe Fillmap is a swathe Fillmap within which the currently selected Fillmap tile column is present. For example, if the shaded Fillmap tile column 1435 was being processes, both the swathe Fillmaps 1450, 1470 defined by the print-heads 1401, 1402 are considered active. This is true whether the print-heads 1401, 1402 either partially or wholly cover a Fillmap tile.

After inserting the current Fillmap tile column into the active swathe Fillmaps, fill sequences for edges in the Fillmap tiles are identified in step 1735 and inserted into the fill data store for each active swathe Fillmap in step 1740.

If any active swathe fillmap is now complete, as determined in decision step 1750, i.e.: the tile column inserted is the last for that swathe Fillmap, then the swathe Fillmap is output to the Fillmap spool in step 1755.

If there are still more Fillmap tiles to process 1750, 1765, the next Fillmap tile column is selected in step 1760 and steps 1725, 1730, 1735, 1740, 1750 are repeated.

Once all Fillmap tiles from the input web-width Fillmap have been processed as determined at step 1765 into their respective swathe Fillmaps, the process 1700 is ready to start again with the next input web-width Fillmap.

Fillmap Spooling

The fillmap spool may be either stored local to a corresponding fillmap render host as shown by the spool 640 relative to the render host 690 in FIG. 6, or the spool may be a single storage shared by the render hosts as shown by the spool 540 and the render hosts 590 in FIG. 5. Further, with the arrangement of FIG. 5, depending on size and system requirements, the fillmap spool may be configured as a network attached storage configured between multiple computer devices, one for example handling the job control process 510, PDL spool 520, one or more computers handling the builder processes 530, and another one or more computers handling the render hosts 590. The network attached storage may be a single storage device, or it may be a storage area network whereby there are multiple network attached file stores to improve performance. The fillmap format is relatively compact such that it is possible to stream the fillmap data on-demand over a computer network without affecting the rendering performance of the fillmap render hosts 590.

Where there is a single fillmap spool 540, the processor executing the fillmap builder processes 530 writes all fillmaps to the same spool store. The processor executing job control process 501 tells each fillmap renderer controller 545 and render process 550 where, on the fillmap spool 540 to read the fillmaps from.

Where fillmap spools 640 are configured on the render hosts 690 as in FIG. 6, fillmap builder processes 630 are instructed by the job control process 601 of which render hosts 690 is to receive the fillmap. The job control process 601 then instructs the fillmap render process 650 which fillmap needs to be rendered from its fillmap spool 640. Note that fillmap builder processes 630 are independent of swathes and thus can produce fillmaps for any fillmap render host 690. Such is illustrated in FIG. 6 by the crossed connections 699 between the builder processes 630 and the render hosts 690.

Importantly, in the arrangements of FIGS. 5 and 6, since the builder processes 530, 630 and render hosts 590, 690 are typically implemented in software using threads in a multi-processor or multi-core processing environment, there is no requirement for correspondence between the number of builder processes 530, 630 and the number of render hosts 590, 690.

Fillmap File Management

Each fillmap file written to the fillmap spool 540, 640 is uniquely identifiable. The job control 501, 601 process knows this file name and knows which order the fillmaps need to be rendered, and which render host 590, 690 needs to render a particular fillmap.

In the implementation of FIG. 5, where a single network attached fillmap spool 540 is used, the job control process 501 operates to send instructions to the render controller 545 of each render hosts 590. The instructions are the file names of the fillmaps to be rendered and the instructions are sent in the order in which the fillmaps need to be rendered. Render instructions are only sent by the control process 501 when a fillmap has been produced.

In the implementation of FIG. 6, each render host 690 has local storage of a corresponding fillmap spool 640. The control process 601 periodically checks if a render controller 645 is available so that instructions are sent to the fillmap builder processes 630 to build fillmaps and to provide instructions as to which storage 640 location to output the correspondingly produced swathe fillmap.

Fillmap Rendering

As seen in FIGS. 5 and 6, each render host 590, 690 has a single render controller 545, 645; a single engine control process 570, 670; multiple fillmap render processes 550, 650, and a rendered pixel framestore 560, 660.

The render controller 545, 645 receives the file names of the fillmaps to render from the job control process 501, 601. The render controller 545, 645 acquires a free pixel framestore slot from the engine control process 570, 670 and assigns a current fillmap task and the framestore slot to a fillmap render process 550. A fillmap task is the rendering of a single fillmap from the spool 540,640 by one of the render hosts 590, 690, and may be considered as an intermediate job within the particular PDL print job. The number of fillmap tasks in operation at any one time is determined by the number of concurrent processes required to meet the average per-fillmap-swathe render rate of each individual render host and the complexity of each of the fillmap tasks. A single render host will typically be rendering several fillmaps concurrently, writing pixels to the framestore. However, each host will typically be delivering data to a single CMYK swathe, i.e. one set of print heads. The number of tasks in operation at any one time is generally dependent on the complexity of the tasks and the need to render multiple fillmaps in parallel in order to me the average render rate. For a single render host delivering pixels to a single print swathe the fillmap tasks can be divided down the page. The fillmaps tasks being rendered on a single render server (i.e. one delivering pixels to a single set of CMYK print heads, or a swathe) will be the swathe-sequential print-head tasks. As such, the fillmaps needing to be rendered to continuously provide a stream of pixels to a swathe as the web continues to pass under the print heads.

The fillmap tasks are provided to the render controller 545, 645 in the correct print order. The engine control processes 570, 670 assign pixel framestore slots in a sequential order to maintain correct ordering of rendered pixels in the framestore 560, 660.

The render controller 545, 645 periodically checks if a render process 550, 650 is available to process the fillmap task received from the job control process. Fillmap tasks can be assigned to any available render processes 550, 650 as soon as the render controller 545, 645 has a fillmap task and has received a free framestore slot from the engine control 570, 670. In this case, the render process 550, 650 sources the fillmap task from the fillmap spool 540 in FIG. 5, or the corresponding spool 640 in FIG. 6, and commences processing of the fillmap task.

Since the fillmap page representation does not require any additional resources, fillmap rendering can continue without stopping from one print job to the next. The render host 590, 690 is not concerned when one PDL job starts or finishes and will continue to render each and every fillmap as it arrives.

Pixel Delivery

The engine control process 570, 670 manages slot assignments in the pixel framestore 560, 660 and data delivery to the corresponding print heads 580, 680. Unused framestore slots are assigned sequentially to fillmap render tasks as requested from the render controller 545, 645. Memory slots within the framestore 560, 660 are treated as a circular buffer, delivering pixels to the print head 580, 680 from one end while assigning free slots from the other end.

Output Coherency

Multiple parallel fillmap builder 530, 630 processes will produce fillmaps at varying rates based on the relative complexity of each PDL page. Nevertheless, output pixel coherency (to the print engine 585, 685) is assured by the job and task ordering inherent in the configurations of the print systems 500, 600.

The job control process 501, 601 only dispatches fillmap tasks 502, 602 to the fillmap render controllers 545, 645 in the correct order. The fillmap spool 540, 640 is capable of buffering large numbers of fillmaps, and decouples the generally erratic fillmap building process 530, 630 from the rendering process 55, 650. The job control process 501, 601 can therefore wait as long as needed to ensure that fillmaps are dispatched to the render controller 545, 645 in the correct order.

The render controller 545, 645 queues fillmaps for rendering in the order that the fillmaps are received by the render controller 545, 645. Since the job control process 501, 601 is responsible for order of all jobs and thus fillmaps in the system 500, 600, this order is assumed to be correct. The engine control process 57, 670 allocates fillmap slots from the framestore 560, 660 sequentially and provides these to the render controller 545, 645. This assures that fillmap ordering and framestore slot ordering are in-step.

PDL rendering is highly variable with some pages taking fractions of a second while other pages can take minutes. Fillmap rendering however removes this variability and provides a consistent on-average render time without the high variability of PDL rendering. Utilising fillmaps to decouple the uncertainty of full PDL rendering for the pixel delivery back-end enables the render servers 590, 690 to better keep pace with the printer engine 585, 685.

The engine controller 570, 670 manages the framestore 560, 660 as a first-in-first-out (FIFO) queue. As render tasks 502, 602 arrive, they are assigned the next available slot by the render controller 545, 645. As data is sent to the print-heads 580, 680, the oldest slot is released. This control system configuration ensures that framestore slots are never allocated out of order.

Data Underflow

Even though every effort is made to ensure the fillmap building and rendering meet the on-average performance requirements for a given system, it is always possible that some PDL jobs will consist of too many complex pages. This could impact on fillmap render time such that the average render time tends towards the maximum for the fillmaps, thus threatening to empty the pixel framestore.

Alternatively, the fillmap buffering choices may be too optimistic for the particular PDL jobs and the fillmap queue may empty, which will cause a follow-on condition where the pixel framestore empties.

The job control process 501, 601 monitors the utilisation of the fillmap spool 540, 640 and pixel framestore 560, 660. Should either of these buffers fall below a critical level, the job control process 501, 601 can instruct the printer engine 585, 685 to either slow down or even stop (stall) until the buffers return to a sufficiently high (full) level that the print engine can resume full-speed operation.

Example 1

In a preferred implementation, the print engine 585 comprises a web-fed printer with a 750 mm wide, 4 colour print head array as shown in FIG. 4. The print head array comprises 4 rows 431-434 of 7 print heads each. Each individual print head slightly overlaps the adjacent print heads such that the 7 print heads in a row are staggered across the web. Each of the 4 rows of print heads delivers a single colour to the print web. These colours will typically be cyan, magenta, yellow and black, but can be any colour.

The preferred implementation for a colour system used a 1 multi-core render server 590 dedicated to each 4-colour swathe 580. For a target print engine as described, there will be 7 render servers, one render server for each 4-colour swathe. Each render server 590 has a direct high-speed connection to the print-heads to which it is supplying pixel data.

Figure 18:
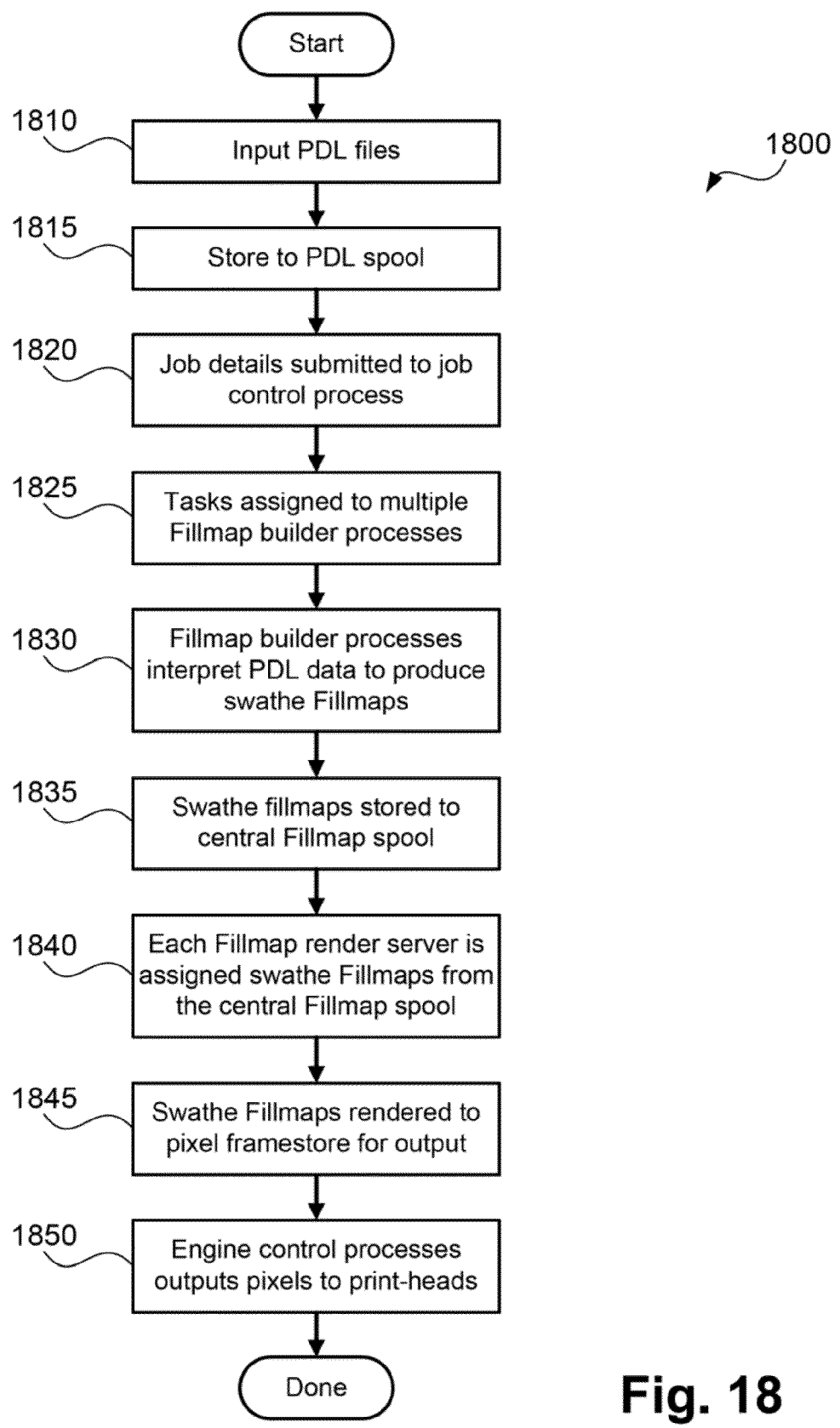
FIG. 18 is a flowchart illustrating the process from input of PDL files to output of pixels.

FIG. 18 depicts a flowchart of a method 1800 for the processing of input PDL files to the output of pixels. The method 1800 is performed by the processor unit 1105 of the computer system 1100 of FIG. 11A which executes software 1133 loaded from the memory 1106. As illustrated, at start the PDL data is input in step 1810 is and stored in the PDL spool in step 1815. Details of the job to be processed including swathe layout information are submitted to the job control process in step 1820. Fillmap building tasks are assigned by the job control process to the multiple Fillmap builder processes in step 1825.

The page layout information will define how input PDL pages are to be imposed upon the web for printing. The layout of the pages on the web affects which parts of pages are present on a swathe. The exact layout details are dependent on the job, input PDL and finishing, folding options or cutting. A simple layout used for cutting the finished product into pages is described as follows:

Assuming an as-stated 750 mm wide web, and the requirement to impose A4 sized pages upon the web, the layout is calculated as follows:

A4 pages 460 in a portrait orientation are imposed across the sheet 410. The width 470 of a portrait A4 page is 210 mm and the height 480 of a portrait A4 page is 297 mm Given the page width of 210 mm, three A4 pages will fit across the web using 630 mm of the 750 mm web width 445. If spaced evenly, the inter-page spacing and the spacing from the edge of the web 460 is equal to 30 mm, i.e.: (750 mm-630 mm)/4.

The spacing between rows of pages 490 in the direction of travel 440 is nominal and not dependent on the size of the web or the pages imposed upon it. The spacing can be 30 mm just as the horizontal spacing 460 is, but can just as easily be any other value.

These calculations detail one layout method useful when the product will be cut into separate pages. For other applications such as folding and brochures, different layout requirements will dictate the placement of pages on the web and their relative spacing and number across the web.

These layout calculations dictate how input PDL data will be handled when building swathe fillmaps.

Fillmap building tasks are assigned by the job control process to the multiple Fillmap builder processes in step 1825.

The Fillmap builder processes interpret the input swathe PDL data and produce swathe Fillmaps in step 1830. The swathe Fillmaps are then stored to the central Fillmap spool in step 1835.

The job control process assigns swathe Fillmaps to the render servers in the correct rendering order from the central Fillmap spool in step 1840. The swathe Fillmaps are rendered to a pixel framestore on each render server in step 1845 and the engine control process controls the pixel delivery to the print-heads in step 1850.

The number of fillmap build servers 535 is variable, customisable and can be scaled to handle different types of input. As an example, document data that is all or mostly text will require fewer fillmap build servers that more complex documents including many images. The fillmap build servers 535 read input PDL data from a single PDL spool 520 on a network. The number of builder servers 530 is dependent on the job data and performance requirements, not the number of render servers 590.

A single network attached fillmap spool 540 was utilised by all render servers 590 and all the fillmap build servers 530. Fillmap builder servers 530 write to the single fillmap spool 540, and fillmap render servers 590 read fillmaps for rendering from the fillmap spool 540.

The servers are desirably multi-core standalone, blade or rack mount servers, and connected via a suitable switched network such as 1 or 10 gigabit Ethernet.

Example 2

In an alternate implementation, the print engine 685 comprises a web-fed printer with a 750 mm wide, 4 colour print head array as shown in FIG. 4. The print head array comprises 4 rows 431-434 of 7 print heads each. Each individual print head slightly overlaps the adjacent print heads such that the 7 print heads in a row are staggered across the web. Each of the 4 rows of print heads delivers a single colour to the print web. These colours will typically be cyan, magenta, yellow and black, but can be any colour.

The arrangement for a colour system is 1 multi-core render server 690 dedicated to each 4-colour swathe 730. For a target print engine 685 as described, there are 7 render servers 690, one render server for each 4-colour swathe of print heads. Each render server 690 has a corresponding dedicated fillmap spool 640.

The number of fillmap build servers 635 is variable, customisable and can be scaled to handle different types of input. As an example, document data that is all or mostly text typically requires fewer fillmap build servers that more complex documents formed with many images. The fillmap build servers 635 read input PDL data from a single PDL spool 620 on the network (e.g. 1120). The number of builder servers 635 is again dependent on the job data and performance requirements, not the number of render servers 690.

Figure 19:
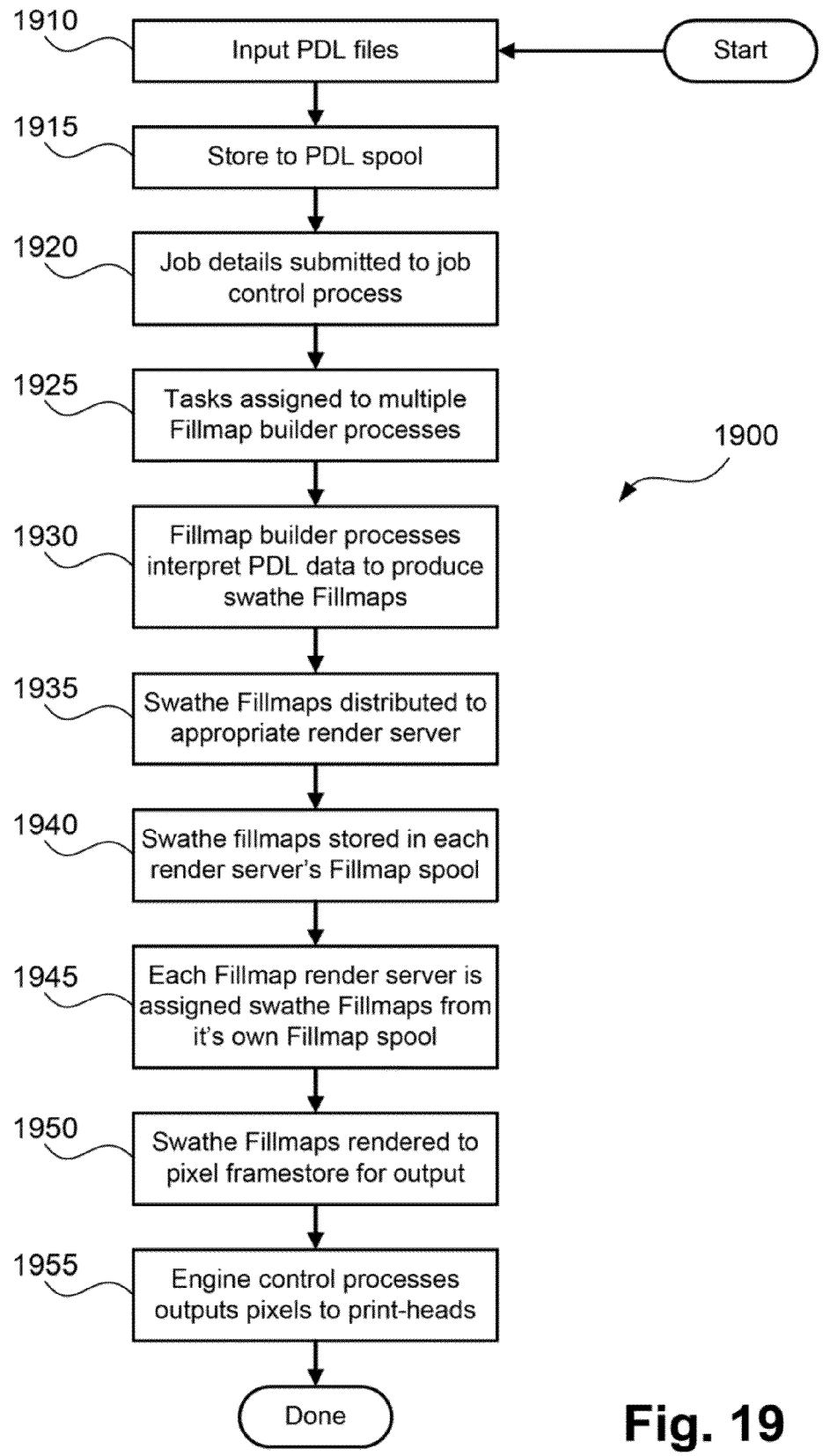
FIG. 19 is a flowchart illustrating an example process from input of PDL files to output of pixels.

With reference to an exemplary method 1900 represented by the flowchart of FIG. 19, at start the PDL data is input in step 1910 and is stored in the PDL spool in step 1915. Details of the job to be processed including swathe layout information are submitted to the job control process in step 1920. Fillmap building tasks are assigned by the job control process to the multiple Fillmap builder processes in step 1925.

The Fillmap builder processes interpret the input swathe PDL data and produce swathe Fillmaps in step 1930. The swathe Fillmaps are distributed to the appropriate render server in step 1935 for the swathe data and stored in the Fillmap spool of the corresponding render server in step 1940.

The job control process assigns swathe Fillmaps to the render servers in the correct rendering order from each render server's own Fillmap spool in step 1945. The swathe Fillmaps are rendered to a pixel framestore on each render server in step 1950 and the engine control process controls the pixel delivery to the print-heads in step 1955. The flowchart of FIG. 19 is performed by the processor unit 1105 of the computer system 1100 of FIG. 11A which executes software 1133 loaded from the memory 1106.

As in the preferred implementation, fillmaps are stored in a fillmap spool of the multiple fillmap spools 640, each stored on a corresponding render server 690. As the build servers 635 produce fillmap swathes, the fillmaps are written to the fillmap spool 640 on the appropriate render server such that the rendered data can be delivered to the correct print head 730.

The job control process 601 determines which fillmap spool 640 the output fillmap needs to be written to and informs the builder process 630 prior to fillmap building. After fillmap building, job control 601 informs the render controller 645 which file on the local fillmap spool 640 is to be rendered next.

It is possible for any builder process 630 to produce a fillmap targeted at any print head swathe. Build processes are not dedicated to particular swathes and can output to any of the fillmap spools 640 on any render server 690.

The servers will typically be multi-core standalone, blade or rack mount servers. The servers will be connected via a suitable switched network such as 1 or 10 gigabit Ethernet.

Example 3

In a third implementation, the print engine comprises a web-fed printer with a 1000 mm wide, with a single colour print head array such as illustrated in FIG. 3. As seen, a partial section of the paper web 310 has printed pages 350 imposed upon it. The print head array 330 comprises a single row of 7 monochromatic print heads. Each individual print head slightly overlaps the adjacent print heads such that the 7 print heads in a row are staggered across the web 310. A printer configured in this way is typically used to print only black; however there is no limitation in the system to only print black. Any other colour could be used for single colour printing.

The rendering and bandwidth requirements for a single colour printing are less than those for full-colour. As such, dedicated render server per swathe is not required for a single colour web-fed digital press. Since a single render server can deliver data to 4 swathe print-heads already, then a single render server can be used to provide data to 4 of the 7 print-heads in the single colour system. An addition render server can provide data to the remaining 3 print-heads in the system.

Likewise, spooling requirements are also reduced and a 4-swathe single colour render server can be serviced by a single fillmap spool 540.

The number of fillmap build servers 535 is variable, customisable and can be scaled to handle different types of input. As an example, document data that is all or mostly text will require fewer fillmap build servers that more complex documents with lots of images. The fillmap build servers 535 read input PDL data from a single PDL spool 520 on the network. The number of builder servers is dependent on the job data and performance requirements, not the number of render servers 590.

In this example, print job processing is the same as for the preferred embodiment, with reference to the flowchart of FIG. 18, at start the input PDL data of step 1810 is stored in the PDL spool in step 1815. Details of the job to be processed including swathe layout information are submitted to the job control process in step 1820. Fillmap building tasks are assigned by the job control process to the multiple Fillmap builder processes in step 1825.

The Fillmap builder processes interpret the input swathe PDL data and produce swathe Fillmaps in step 1830. The swathe Fillmaps are then stored to the central Fillmap spool in step 1835.

The job control process assigns swathe Fillmaps to the render servers in the correct rendering order from the central Fillmap spool in step 1840. The swathe Fillmaps are rendered to a pixel framestore on each render server in step 1845 and the engine control process controls the pixel delivery to the print-heads in step 1850.

For a single colour system, two render servers 590 are used. Each render server 590 reads fillmaps from the fillmap spool 540, processes the fillmaps to pixels in the render process 550 and stores the pixels to the framestore 560.

The engine controller 570 on one of the render hosts 590 in the colour system will supply monochrome pixels to 4 of the 7 print-heads 580 of the printer engine. The engine controller 570 of a second render host 590, will supply monochrome pixel data to remaining 3 of the 7 print-heads 580 of the printer engine.

Example 4

In a preferred fourth implementation, the print engine comprises a web-fed printer with a 750 mm wide, 4 colour print head array as shown in FIG. 4. The print head array comprises 4 rows 431-434 of 7 print heads each. Each individual print head slightly overlaps the adjacent print heads such that the 7 print heads in a row are staggered across the web. Each of the 4 rows of print heads delivers a single colour to the print web. These colours will typically be cyan, magenta, yellow and black, but can be any colour. The Input PDL job data is pre-imposed web-width data in a height approximately that of a page with space for inter-section gutter and imposition markings.

The arrangement for a colour system is 1 multi-core render server 590 dedicated to each 4-colour swathe 580. For a target print engine as described, there will be 7 render servers, one render server for each 4-colour swathe. Each render server has a direct high-speed connection to the print-heads it is supplying data to.

Figure 20:
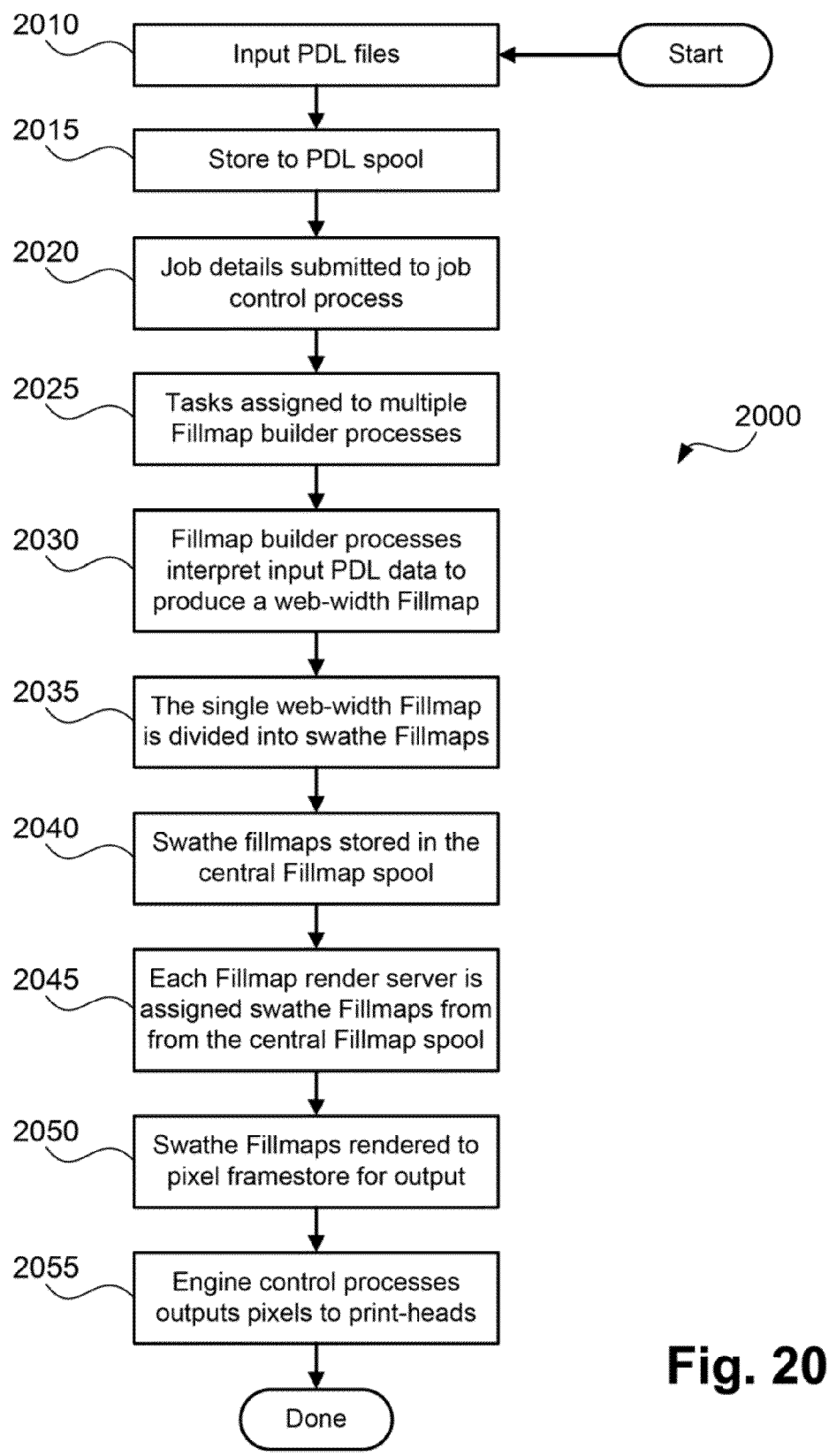
FIG. 20 is a flowchart illustrating another example process from input of PDL files to output of pixels.

With reference to the flowchart of FIG. 20, an exemplary method 2000 starts with the input of PDL data at step 2010, which is stored in the PDL spool in step 2015. Details of the job to be processed including swathe layout information, are submitted to the job control process in step 2020. Fillmap building tasks are assigned by the job control process to the multiple Fillmap builder processes in step 2025.

The Fillmap building process converts the web-width PDL data into a web-width Fillmap representation in step 2030. The web-width Fillmap is then divided into swathe-width Fillmaps in step 2035, which are stored to the Fillmap spool in step 2040.

The job control process assigns Fillmaps to be rendered to each render server in step 2045, in the order in which they need to be output to the print-head. The swathe Fillmaps are rendered to a pixel framestore on each render server in step 2050 and the engine control process controls the pixel delivery to the print-heads in step 2055. The flowchart of FIG. 18 is performed by the processor unit 1105 of the computer system 1100 of FIG. 11A which executes software 1133 loaded from the memory 1106.

Example 5

In a fifth implementation, the print engine comprises a web-fed printer with a 750 mm wide, 4 colour print head array as shown in FIG. 4. The print head array comprises 4 rows 431-434 of 7 print heads each. Each individual print head slightly overlaps the adjacent print heads such that the 7 print heads in a row are staggered across the web. Each of the 4 rows of print heads delivers a single colour to the print web. These colours will typically be cyan, magenta, yellow and black, but can be any colour. The Input PDL job data consists of individual pages that are to be imposed upon the web-wide printable media with a height approximately that of a page with space for inter-section gutter and imposition markings.

The arrangement for a colour system is 1 multi-core render server 590 dedicated to each 4-colour swathe 580. For a target print engine as described, there will be 7 render servers, one render server for each 4-colour swathe. Each render server has a direct high-speed connection to the print-heads it is supplying data to.

Figure 21:
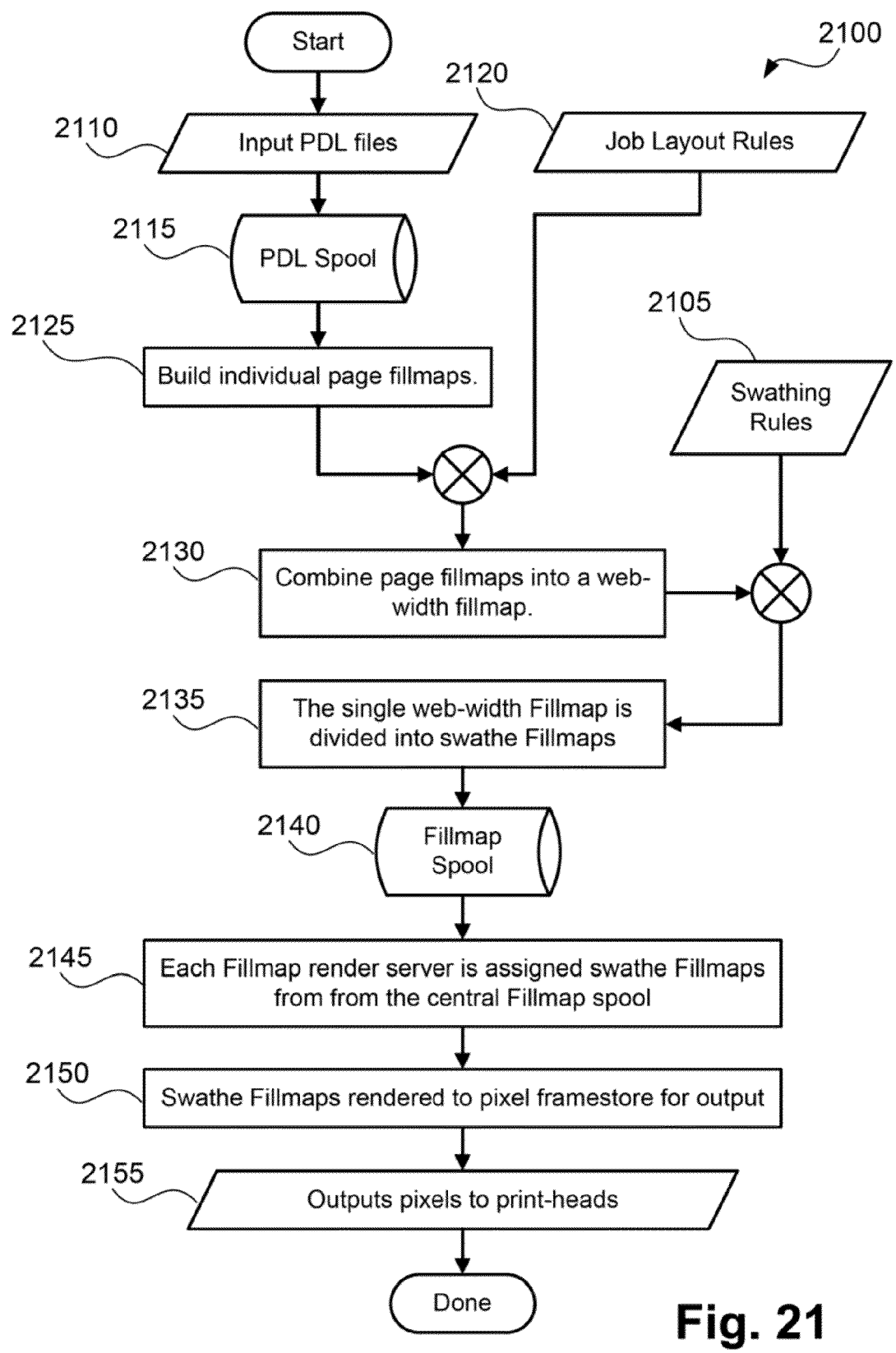
FIG. 21 is a flowchart illustrating another example process from input of PDL files to output of pixels.

With reference to an exemplary method 2100 shown in the flowchart of FIG. 21, at start the PDL data is input in step 2110 and is submitted to the system and stored in the PDL spool in step 2115. The individual page fillmaps are produced for each PDL page in step 2125. The production of which can either be sequential or concurrent.

Page fillmaps are built in step 2125 are combined into a web-wide fillmap in step 2130 by application of the job layout rules 2120. The fillmap headers and fill data stores of the individual page fillmaps are combined into a single fillmap header and fill data store for the web-wide fillmap.

The single web-wide fillmap with the page fillmaps imposed is divided into swathe-width fillmaps in step 2135 according to the swathing rules 2105. The swathe-width fillmaps are stored in the fillmap spool in step 2140.

The job control process assigns Fillmaps to be rendered to each render server in step 2145, in the order in which they need to be output to the print-head. The swathe Fillmaps are rendered to a pixel framestore on each render server in step 2150 and the engine control process controls the output of and pixel delivery to the print-heads in step 2155.

The flowchart of FIG. 21 is performed by the processor unit 1105 of the computer system 1100 of FIG. 11A which executes software 1133 loaded from the memory 1106.

As in the other implementations, print jobs are managed by the job control process 501, which is controlled by a list of PDL job details 515.

The servers may typically be multi-core standalone, blade or rack mount servers. The servers will be connected via a suitable switched network such as 1 or 10 gigabit Ethernet.

INDUSTRIAL APPLICABILITY

The arrangements described are applicable to the computer and data processing industries and particularly for high-speed high volume printing.

The foregoing describes only some embodiments of the present invention, and modifications and/or changes can be made thereto without departing from the scope and spirit of the invention, the embodiments being illustrative and not restrictive.

The invention claimed is:

1. A method of rendering a print job using a plurality of print heads, said method comprising:

inputting the print job in a page description language format to render multiple pages in a row on a web;

processing the print job to produce a plurality of intermediate jobs in an intermediate graphical format based on the plurality of print heads across the web, the intermediate jobs having the intermediate graphical format between the page description language format and a rasterized image format; and rendering, independently of one another, each of the plurality of intermediate jobs to a rasterized image in a renderer associated with each of the print heads to be printed by a corresponding one of the print heads.

2. A method according to claim 1, wherein said processing step further comprises:

converting the print job in the page description language format into an intermediate representation corresponding to the web; and segmenting the intermediate representation into the plurality of intermediate jobs to be rendered by adding additional edges and associated fills into at least one of the plurality of intermediate jobs.

3. A method according to claim 2, wherein:

the intermediate representation is segmented by adding additional edges and associated fills into at least one of the plurality of intermediate jobs.

4. A method according to claim 1, said processing step further comprising the steps of:

dividing the print job in the page description language format into a plurality of page description language tasks for which a number of said page description language tasks is determined by the number of print heads; and converting the plurality of page description language tasks to the plurality of intermediate jobs.

5. A method as described in claim 1 wherein said processing step produces a plurality of swathes in fillmap format as a plurality of intermediate jobs.

6. A method according to claim 1, wherein each of the print heads operates independent of external input, said external input comprises at least one of:

(a) a font resource;
(b) a global object in Personalised Print Markup Language format;
(c) a reusable object in Personalised Print Markup Language format; and
(d) an image.

7. A method according to claim 1, wherein said processing steps comprises a creating step of creating headers to refer tiles and fill data stores to store colour and transparency each corresponding to each of the plurality of intermediate jobs, by extracting corresponding entries from an original header and fill data store.

8. A method according to claim 1, wherein adjacent intermediate jobs other overlap each other.

9. A method according to claim 1, wherein said processing steps comprises creating step of creating empty tiles in a web wide intermediate job before the plurality of intermediate jobs are created.

10. An apparatus for rendering a print job said apparatus comprising:

a plurality of print heads on a printer targeted for printing the print job;

an intermediate format builder for inputting the print job in a page description language format to render multiple pages in a row on a web, and processing the print job to produce a plurality of intermediate jobs in an intermediate graphical format based on the plurality of print heads across the web, the intermediate jobs having the intermediate graphical format between the page description language format and a rasterized image format; and a rendering processor for rendering, independently of one another, each of the plurality of intermediate jobs to a rasterized image in a renderer associated with each of the print heads to be printed by a corresponding one of the print heads.

11. An apparatus according to claim 10, said rendering processor being configured to:

convert the print job in the page description language format into an intermediate representation corresponding to the web; and segment the intermediate representation into the plurality of intermediate jobs to be rendered by adding additional edges and associated fills into at least one of the plurality of intermediate jobs.

12. An apparatus according to claim 11, wherein the intermediate representation is segmented by adding additional edges and associated fills into at least one of the plurality of intermediate jobs.

13. An apparatus according to claim 11, wherein the processor has a plurality of renderers, each of the renderers associated with one of the print heads.

14. An apparatus according to claim 13, wherein said intermediate format builder creates headers to refer tiles and fill data stores to store colour and transparency each corresponding to each of the plurality of intermediate jobs, by extracting corresponding entries from an original header and fill data store.

15. An apparatus according to claim 13, wherein adjacent intermediate jobs overlap each other.

16. An apparatus according to claim 13, wherein said intermediate format builder creates empty tiles in a web wide intermediate job before the plurality of intermediate jobs are created.

17. A non-transitory tangible computer-readable storage medium having a program recorded thereon, the program be executable by at least one computer for rendering a print job using a plurality of print heads, said program comprising:

code for inputting the print job in a page description language format to render multiple pages in a row of a web;

code for processing the print job to produce a plurality of intermediate jobs in an intermediate graphical format based on the plurality of print heads across the web, the intermediate jobs having the intermediate graphical format between the page description language format and a rasterized image format; and code for rendering, independently of one another, each of the plurality of intermediate jobs to a rasterized image in a renderer associated with each of the print heads to be printed by a corresponding one of the print heads.

18. A non-transitory tangible computer-readable storage medium according to claim 17, wherein headers to refer tiles, and fill data stores to store colour and transparency, are created by extracting corresponding entries from an original header and fill data store, each of the headers and fill data stores corresponding to each of the plurality of intermediate jobs.

19. A non-transitory tangible computer-readable storage medium according to claim 17, wherein intermediate jobs which are next to each other overlap each other.

20. A method according to claim 1, wherein empty tiles in a web wide intermediate job are created before the plurality of intermediate jobs are created.

21. A method according to claim 1, wherein at least one of the intermediate jobs being generated by generating a web width job in an intermediate format for the print job in the page description language format; and segmenting the web width job into a plurality of print head width jobs in the intermediate format based on the number and the width of the print heads.

22. A method according to claim 21, wherein segmenting is based on geometry of a printer associated with the plurality of print heads, wherein geometry includes the width of the web and overlap of the print heads.

23. A method according to claim 2, wherein at least one additional fill is derived from an intermediate job adjacent to said intermediate job.

\* \* \* \* \*